US012217263B2

(12) United States Patent
Pandillapalli et al.

(10) Patent No.: US 12,217,263 B2
(45) Date of Patent: Feb. 4, 2025

(54) METHODS AND SYSTEMS FOR PREDICTING ACCOUNT-LEVEL RISK SCORES OF CARDHOLDERS

(71) Applicant: Mastercard International Incorporated, Purchase, NY (US)

(72) Inventors: Bhargav Pandillapalli, Atmakur (IN); Rajesh Kumar Ranjan, Madhubani (IN); Ankur Saraswat, Gurgaon (IN); Kshitij Gangwar, Bareilly (IN); Kamal Kant, Patna (IN); Sonali Syngal, Gurgaon (IN); Suhas Powar, Kolhapur (IN); Debasmita Das, Kolkata (IN); Pritam Kumar Nath, Kolkata (IN); Nishant Pant, Dehradun (IN); Yatin Katyal, Rohtak (IN); Nitish Kumar, Jamshedpur (IN); Karamjit Singh, Gurugram (IN)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 17/739,045

(22) Filed: May 6, 2022

(65) Prior Publication Data

US 2022/0358508 A1  Nov. 10, 2022

(30) Foreign Application Priority Data

May 8, 2021  (IN) .............................. 202141020933

(51) Int. Cl.
*G06Q 20/40* (2012.01)
*G06Q 20/36* (2012.01)
(Continued)

(52) U.S. Cl.
CPC ......... *G06Q 20/4016* (2013.01); *G06Q 20/36* (2013.01); *G06Q 20/389* (2013.01); *G06Q 40/03* (2023.01)

(58) Field of Classification Search
CPC .... G06Q 20/4016; G06Q 40/03; G06Q 20/36; G06Q 20/389
(Continued)

(56) References Cited

U.S. PATENT DOCUMENTS 10,825,028 B1   11/2020  Kramme et al.
10,909,527 B2 *  2/2021  Rule ..................... H04L 9/3271
(Continued)

FOREIGN PATENT DOCUMENTS

CN     105830104 A  *  8/2016  ............. G06F 15/16
EP        2983119      2/2016
WO  WO-2022064780 A1 *  3/2022

OTHER PUBLICATIONS

Development of an Intelligent Module for Monitoring and Analysis of Client's Bank Transactions IEEE 2019 (Year: 2019).*
(Continued)

*Primary Examiner* — Bruce I Ebersman
(74) *Attorney, Agent, or Firm* — Barta Jones PLLC

(57) ABSTRACT

Embodiments provide artificial intelligence-based methods and systems for predicting account-level risk scores associated with cardholders. Method performed by server system includes accessing payment transaction data and cardholder risk data associated with cardholder. The payment transaction data includes transaction variables associated with past payment transactions performed at Point of Interaction (POI) terminals within a particular time window. Method includes generating cardholder profile data based on the transaction variables and the cardholder risk data. Method includes determining account-level risk scores associated (Continued)

with the cardholder based on cardholder profile data. Each account-level risk score of account-level risk scores is determined by a trained machine learning model. The account-level risk scores include a wallet reload risk score, an account reissuance risk score, and a transaction channel risk score. Further, the method includes transmitting a recommendation message to an issuer server associated with the cardholder based on the account-level risk scores.

20 Claims, 13 Drawing Sheets

(51) Int. Cl.
  *G06Q 20/38* (2012.01)
  *G06Q 40/03* (2023.01)
(58) Field of Classification Search
  USPC .......................................................... 705/44
  IPC ....................................................... G06Q 40/00
  See application file for complete search history.

(56) References Cited

U.S. PATENT DOCUMENTS

| | | | |
|---|---|---|---|
| 11,042,930 | B1 | 6/2021 | Mintz et al. |
| 11,522,700 | B1 * | 12/2022 | Auerbach ............. H04L 9/3213 |
| 2002/0139837 | A1 | 10/2002 | Spitz |
| 2010/0070405 | A1 | 3/2010 | Joa et al. |
| 2016/0364727 | A1 | 12/2016 | DeLawter et al. |
| 2017/0178134 | A1 | 6/2017 | Senci et al. |
| 2019/0065610 | A1 * | 2/2019 | Singh .................. G06F 16/9535 |
| 2019/0087805 | A1 | 3/2019 | Hayes et al. |
| 2019/0130406 | A1 | 5/2019 | Marcjan et al. |
| 2019/0230070 | A1 * | 7/2019 | Isaacson ............. H04W 12/084 |
| 2019/0295085 | A1 | 9/2019 | Ashiya et al. |
| 2020/0043006 | A1 | 2/2020 | Ratnapu et al. |
| 2021/0158358 | A1 | 5/2021 | Gu et al. |
| 2022/0036219 | A1 | 2/2022 | Assefa et al. |
| 2022/0108329 | A1 | 4/2022 | Wu et al. |
| 2022/0198470 | A1 | 6/2022 | Melul et al. |
| 2023/0419397 | A1 * | 12/2023 | Kushner .............. G06Q 50/186 |

OTHER PUBLICATIONS

Smart Acquiring Platform in Contactless Payments using Advanced Machine Learning : Security Controls using Device Recognition, Geo Fencing and Customer on File IEEE 2023 (Year: 2023).*

* cited by examiner

METHODS AND SYSTEMS FOR PREDICTING ACCOUNT-LEVEL RISK SCORES OF CARDHOLDERS

RELATED APPLICATIONS

This application claims priority to Indian Patent Provisional Application No. 202141020933, filed May 8, 2021, which is incorporated herein by reference in its entirety.

TECHNICAL FIELD

The present disclosure relates to artificial intelligence processing systems and, more particularly to electronic methods and complex processing systems for predicting account-level risk scores of cardholders based on merchant/crypto-wallet risk profiles.

BACKGROUND

Issuing banks, commonly known as issuers, provide payment instruments such as payment cards (credit cards, debit cards, etc.) to cardholders or subscribers. As the subscriber base increases for each issuing bank, it becomes challenging for an issuing bank to manage and control frauds and/or risks associated with transactions made via payment instruments issued by the issuing bank. Even though there are many existing measures to prevent fraud and/or risk associated with the issuing banks, making improvements in fraud/risk management is an ongoing process. For the issuing bank, tracking and forecasting financial frauds in payment transactions across the domestic and global subscriber base is a very challenging task, and more so, with the wide variety of frauds encountered by these issuing banks.

For example, it is a well-known fact that most payment cards reported as fraud have been breached at some point of time in their transaction history. A very little percentage of payment cards committing fraud transactions is non-related to a breach such as lost or stolen cards, friendly fraud, etc. Suspected breach locations are categorized into the actual breach, testing, and fraud attack merchants. Each of these categories has a high fraud report rate but the behavior of each category is very different. A breach location is where information of cards is being stolen. A testing location is one where stolen information is validated by doing small transactions by hackers, after which these cards are sold in markets. A fraud attack location is where bulk stolen cards that have been validated are used to buy goods.

Additionally, the payment ecosystem remains vulnerable despite advances in the payment industry, and the fraud risk system is better armed than before. Despite payment cards being at risk and with high compromise potential across suspicious merchants, channels, or on the dark web, only a small portion of payment cards that are at risk end up being used for fraudulent transactions and is needing to be reissued by the issuer. This statistic is placed at only a few percent of payment cards that truly experience fraud and being more precise with detection can help issuers in saving money on the account reissuance process.

As data breaches continue to increase, issuers often prepare to completely fund an entire mass reissuance program with a lack of insight on which cards are truly at risk of fraud. A crucial part of controlling payment card fraud is to be proactive rather than reactive in approach to identifying fraud. One aspect of that effort for issuers is being able to identify the common point of purchase (CPP). The CPP can be a breach location where an attack or a fraudulent transaction might take place. The CPP refers to the ability to identify a likely merchant location where credit card numbers were stolen so that banks can mitigate future fraud on accounts likely to transact there in the future. It is generally much easier to identify cards that have been compromised once fraud has been reported, but the ability to discern those at risk of transacting at a compromised merchant or in a compromised channel is much more difficult. When an issuing bank has to deal with such frauds or risks for millions of its subscribers, it becomes an operational challenge without much error tolerance.

Thus, there exists a need for a technical solution to overcome the above-stated disadvantages.

SUMMARY

Various embodiments of the present disclosure provide artificial intelligence-based methods and systems for predicting account-level risk scores of cardholders.

In an embodiment, a computer-implemented method for predicting account-level risk scores associated with a cardholder is disclosed. The computer-implemented method performed by a server system includes accessing payment transaction data and cardholder risk data associated with a cardholder. The payment transaction data includes a plurality of transaction variables associated with past payment transactions performed at one or more Point of Interaction (POI) terminals within a particular time window. The method includes generating cardholder profile data associated with the cardholder based, at least in part, on the plurality of transaction variables and the cardholder risk data. The method includes determining a plurality of account-level risk scores associated with the cardholder based, at least in part, on the cardholder profile data. Each account-level risk score of the plurality of account-level risk scores is determined by a trained machine learning model. The plurality of account-level risk scores includes a wallet reload risk score, an account reissuance risk score, and a transaction channel risk score. Further, the method includes transmitting a recommendation message to an issuer server associated with the cardholder based, at least in part, on the plurality of account-level risk scores.

In another embodiment, a server system is disclosed. The server system includes a communication interface and a memory including executable instructions. The server system also includes a processor communicably coupled to the memory. The processor is configured to execute the instructions to cause the server system, at least in part, to access payment transaction data and cardholder risk data associated with a cardholder. The payment transaction data includes a plurality of transaction variables associated with past payment transactions performed at one or more Point of Interaction (POI) terminals within a particular time window. The server system is caused to generate cardholder profile data associated with the cardholder based, at least in part, on the plurality of transaction variables and the cardholder risk data. Furthermore, the server system is caused to determine a plurality of account-level risk scores associated with the cardholder based, at least in part, on the cardholder profile data. Each account-level risk score of the plurality of account-level risk scores is determined by a trained machine learning model. The plurality of account-level risk scores includes a wallet reload risk score, an account reissuance risk score, and a transaction channel risk score. The server system is also caused to transmit a recommendation message to an issuer server associated with the cardholder based, at least in part, on the plurality of account-level risk scores.

In yet another embodiment, a non-transitory computer-readable storage medium is disclosed. The non-transitory computer-readable storage medium includes computer-executable instructions that, when executed by at least a processor of a server system, cause the server system to perform a method. The method includes accessing payment transaction data and cardholder risk data associated with a cardholder. The payment transaction data includes a plurality of transaction variables associated with past payment transactions performed at one or more Point of Interaction (POI) terminals within a particular time window. The method further includes generating cardholder profile data associated with the cardholder based, at least in part, on the plurality of transaction variables and the cardholder risk data. Furthermore, the method includes determining a plurality of account-level risk scores associated with the cardholder based, at least in part, on the cardholder profile data. Each account-level risk score of the plurality of account-level risk scores is determined by a trained machine learning model. The plurality of account-level risk scores includes a wallet reload risk score, an account reissuance risk score, and a transaction channel risk score. The method also includes transmitting a recommendation message to an issuer server associated with the cardholder based, at least in part, on the plurality of account-level risk scores.

BRIEF DESCRIPTION OF THE FIGURES

For a more complete understanding of example embodiments of the present technology, reference is now made to the following descriptions taken in connection with the accompanying drawings in which.

Figure 1A:
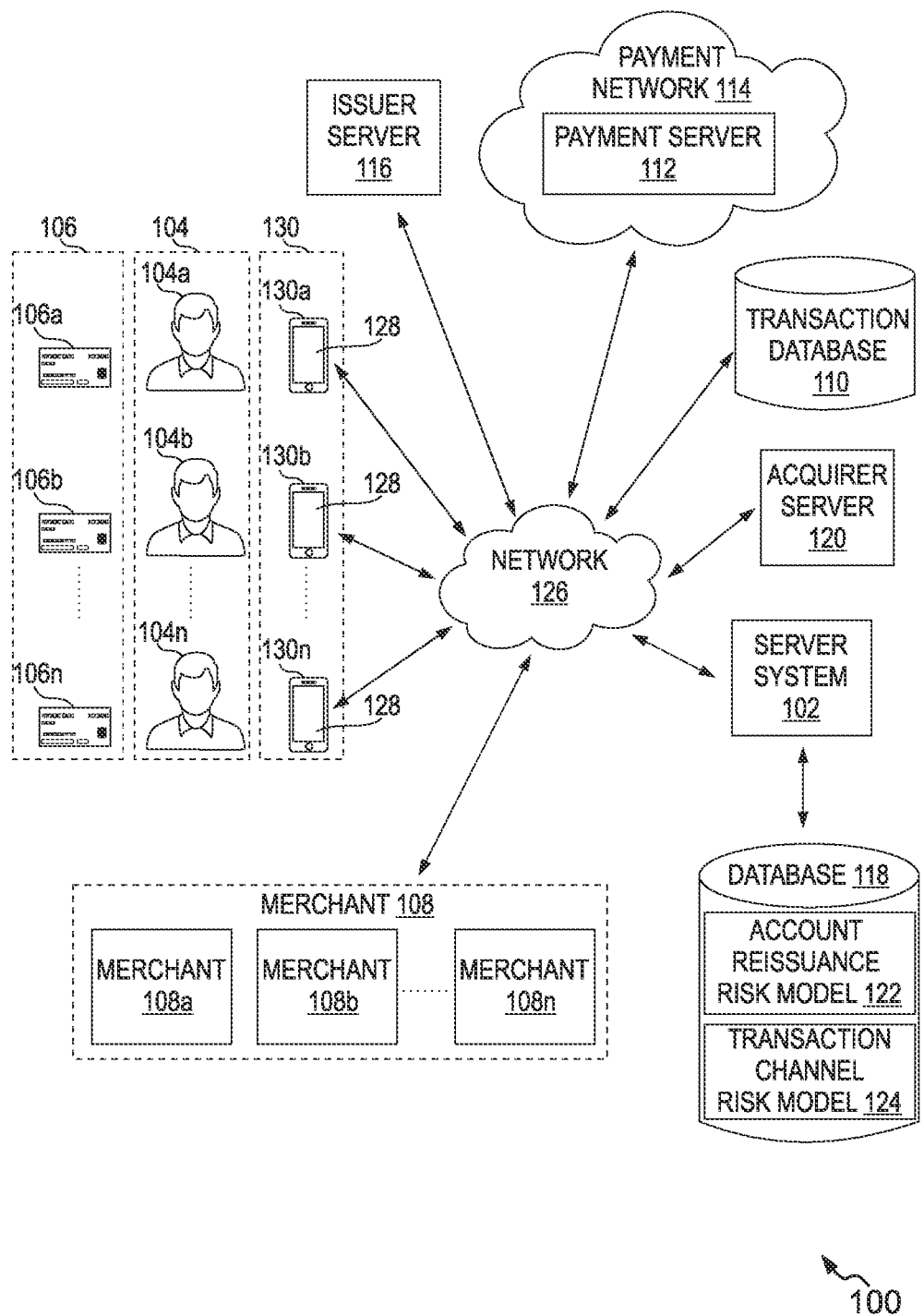
FIG. 1A is an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Embodiments of the present disclosure may be embodied as an apparatus, system, method, or computer program product. Accordingly, embodiments of the present disclosure may take the form of an entire hardware embodiment, an entire software embodiment (including firmware, resident software, micro-code, etc.) or an embodiment combining software and hardware aspects that may all generally be referred to herein as a "circuit," "engine", "module", or "system". Furthermore, aspects of the present disclosure may take the form of a computer program product embodied in one or more computer-readable storage media having computer-readable program code embodied thereon.

The term "payment account" used throughout the description refers to a financial account that is used to fund a financial transaction (interchangeably referred to as "card-on-file payment transaction"). Examples of financial account include, but are not limited to a savings account, a credit account, a checking account, and a virtual payment account. The financial account may be associated with an entity such as a person, a family, a commercial entity, a company, a corporation, a governmental entity, a non-profit organization, and the like. In some scenarios, a financial account may be a virtual or temporary payment account that can be mapped or linked to a primary financial account, such as those accounts managed by payment wallet service providers, and the like.

The term "payment network", used herein, refers to a network or collection of systems used for the transfer of funds through the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash substitutes, which may include payment cards, letters of credit, checks, financial accounts, etc. Examples of networks or systems configured to perform as payment networks include those operated by such as Mastercard®.

The term "merchant", used throughout the description generally refers to a seller, a retailer, a purchase location, an organization, or any other entity that is in the business of selling goods or providing services, and it can refer to either a single business location or a chain of business locations of the same entity.

The terms "account holder", "user", "cardholder", and "customer" used throughout the description refer to a person who holds a credit card, a debit card, or a payment network that will be used by a merchant to perform a card-on-file payment transaction.

The terms "crypto-wallet", and "cryptocurrency wallet" are used interchangeably throughout the description and refer to a centralized wallet application connected with a cryptocurrency payment network that facilitates exchanges of X amount in fiat currency into Y amount of cryptocurrency. Conventionally, to accomplish cryptocurrency transactions, the cardholder must interact with a cryptocurrency exchange application (i.e., crypto-wallet) on his/her mobile device. The cardholder must register payment account details of a payment account from which the cardholder wishes to load money into an associated crypto-wallet brokerage or escrow account of the cardholder.

The term "cryptocurrency payment network" may refer to one or more server computers that function to operate and maintain a cryptocurrency system. The cryptocurrency payment network may function to facilitate the generation/issuance and distribution of digital currency between one or more server computers within the cryptocurrency payment network. The cryptocurrency payment network may also function to enable the performance of transactions between the server computers for the transfer of goods/services and/or the transfer of funds. The cryptocurrency payment network may include one or more server computers implementing issuer nodes and distributor nodes. Each issuer node and distributor node may be a server computer associated with a separate financial institution (i.e., each issuer node may be associated with a central bank, federal reserve, or government authority, while each distributor node may be associated with a different commercial bank).

The terms "wallet reload risk score", or "crypto-wallet reload risk score" used throughout the description refers to a likelihood of a cardholder to perform a high-risk or fraudulent wallet transaction into a crypto-wallet intended to perform a cryptocurrency purchase.

The terms "account reissuance risk score" and "card reissuance risk score" used throughout the description refers to a probability of a payment card associated with the cardholder to perform a high-risk or fraudulent transaction and which needs to be reissued by the issuer server in a subsequent time period.

The term "transaction channel risk score" used throughout the description refers to a probability of the payment card associated with the cardholder being compromised while transacting with a risky merchant terminal in a subsequent time period.

OVERVIEW

Various embodiments of the present disclosure provide methods, systems electronic devices, and computer program products for determining account-level risk scores of a cardholder. In some embodiments, artificial intelligence and machine learning techniques may train risk prediction models to generate risk scores based at least on input data.

The present disclosure describes a server system (i.e., risk prediction system) that is configured to predict account-level risk scores of cardholders. In one embodiment, the server system includes at least a processor and a memory. In one non-limiting example, the server system is a payment server. In another example, the server system is associated with an issuer server. The server system is configured to access payment transaction data and cardholder risk data associated with a cardholder. The payment transaction data includes a plurality of transaction variables associated with past payment transactions performed at one or more Point of Interaction (POI) terminals within a particular time window. In one non-limiting example, the one or more POI terminals may be merchant terminals, crypto-wallets, and the like. Some examples of the particular time window can be 3 months, 6 months, 9 months, or 12 months. The cardholder risk data includes transactional-level fraud risk scores, credit risk scores, etc. The plurality of transaction variables includes at least the POI terminal type indicator, payment transaction type indicator, number of spend transactions at the one or more POI terminals within the particular time window, authorization data, and fraud risk data.

In one embodiment, the server system is configured to generate cardholder profile data associated with the cardholder based on the plurality of transaction variables and the cardholder risk data. The cardholder profile data includes (a) wallet transaction features associated with the set of crypto-wallets, (b) spend behavioral pattern features of the cardholder for the plurality of merchants, and (c) cardholder transaction features according to merchant risk profiles.

In one embodiment, the server system is configured to determine a plurality account-level risk scores associated with the cardholder based, at least in part, on the cardholder profile data. Each account-level risk score is determined by a trained machine learning model. The plurality of account-level risk scores includes a wallet reload risk score, an account reissuance risk score, and a transaction channel risk score. Thereafter, the server system is configured to transmit a recommendation message to an issuer server associated with the cardholder based on the plurality of account-level risk scores.

In one embodiment, the server system is configured to predict a likelihood of the cardholder performing risky wallet transactions with a crypto-wallet in a subsequent time interval based, at least in part, on the wallet transaction features associated with the set of crypto-wallets and a wallet reload risk model. The server system is configured to generate the wallet reload risk score associated with the cardholder and the crypto-wallet based, at least in part, on the prediction. In one example, the wallet reload risk model is a classification model.

In one embodiment, the server system is configured to generate the spend behavioral pattern features of the cardholder for the merchant terminals associated with a plurality of merchants where the cardholder has performed payment transactions. The spend behavioral pattern features may include (a) merchant features based on common point of purchase (CPP) compromise risk scores of the plurality of merchants, (b) cardholder interaction features with the plurality of merchants classified into a set of merchant classes, (c) cardholder risk features, (d) payment network related risk features. The server system is then configured to determine the account reissuance risk score for the cardholder based, at least in part, on the spend behavioral pattern features and an account reissuance risk model. The account reissuance risk score indicates a probability of a payment card being reissued to the cardholder due to fraudulent activity by the issuer server in a subsequent time period.

In one embodiment, the server system is configured to classify a set of payment transactions of the cardholder into risky merchant transactions and non-risky merchant transactions based, at least in part, on a transaction channel risk model. The transaction channel risk model is configured to take cardholder transaction features as an input and generate the transaction channel risk score associated with the cardholder for risky merchant transactions based, at least in part, on the classification. The transaction channel risk score indicates a probability of the payment card associated with the cardholder being compromised while transacting with potentially risky merchants in a subsequent time period.

Various embodiments of the present disclosure offer multiple advantages and technical effects. For instance, the present disclosure employs multiple strategies to ensure issuers save resources and money by prioritizing the payment cards to be reissued based on the likelihood of a payment card owned by the cardholder being fraudulent. The present disclosure employs multiple strategies to ensure issuers may be facilitated to take proactive actions such as increasing authentication for transactions on cards that are likely to experience fraud during a crypto-wallet transaction. The present disclosure also provides technical advantages such as facilitating the identification of card types that have a higher likelihood of fraud transactions and finding solutions to make them more secure. The present disclosure employs multiple strategies to increase the performance of fraud and security initiatives by leveraging scores focusing on accounts at most risk of fraud in the future.

The present disclosure helps in designing appropriate controls for the approval of crypto-wallet transactions based on predicted fraud likelihood. Further, the present disclosure provides information of money laundering risk in allowing crypto transactions and recommends proactive actions such as increasing authentication for transactions on payment cards that are likely to experience fraud, and identifying card types that have a higher likelihood of fraud transactions.

The technical improvement in the online payment system as described herein is a computer-based solution to a technical deficiency or problem that is itself rooted in computer technology (e.g., the problem itself derives from the use of computer technology). More specifically, card reissuance risks due to fraud and high risky crypto-wallet transactions are significant problems for transactions conducted over an electronic payment network, especially for online transactions. Therefore, the present disclosure provides a system to predict the account reissuance risk score and the wallet reload risk score of a cardholder and utilize them in authorization-related tasks such that account reissuance and wallet frauds for payment transactions can be minimized.

Various example embodiments of the present disclosure are described hereinafter with reference to FIGS. 1A-1B to 12.

FIG. 1A illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, determining account-level risk scores associated with a cardholder based on merchant interaction. The environment 100 generally includes a server system 102, a plurality of cardholders 104a, 104b . . . 104n (collectively represented as a cardholder 104), a plurality of merchants 108a, 108b . . . 108n (collectively represented as a merchant 108), a transaction database 110, a payment server 112 associated with a payment network 114, an issuer server 116, and an acquirer server 120, each coupled to, and in communication with (and/or with access to) a network 126.

The network 126 may include, without limitation, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among two or more of the parts or users illustrated in FIG. 1A, or any combination thereof. For simplicity of illustration, a certain number of components are shown in FIG. 1A. It is understood, however, that embodiments of the invention may include more than one of each component. In addition, some embodiments of the invention may include fewer than or greater than all of the components shown in FIG. 1A.

Various entities in the environment 100 may connect to the network 126 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, future communication protocols or any combination thereof. For example, the network 126 may include multiple different networks, such as a private network made accessible by the server system 102, the payment network 114 including the payment server 112, the issuer server 116, the acquirer server 120, and a public network (e.g., the Internet, etc.) through which the server system 102 may communicate.

The cardholder 104 may be an individual, representative of a corporate entity, non-profit organization, or any other person. The cardholder 104 may have a payment account issued by corresponding issuing banks (associated with the issuer server 116) and may be provided with a payment card with financial or other account information encoded onto the payment card such that the cardholder 104 may use the payment card to initiate and complete a payment transaction using a bank account at the issuing bank. In one embodiment, the cardholder 104 may have two or more payment accounts issued by multiple issuing banks associated with one or more issuer server 116. Examples of the payment card may include, but are not limited to, a smartcard, a debit card, a credit card, and the like. The cardholders 104a-104n may have payment cards 106a, 106b . . . 106n (collectively, represented as payment card 106). The payment card 106 is used by the cardholder 104 to perform payment transactions with the merchant 108 in exchange for goods and services. In one example, the payment card 106 maybe, but is not limited to, a credit card, a debit card, a smartcard, a charge card, a pre-paid card, a business travel card, a purchasing card, gift card, virtual card, etc.

Further, the plurality of cardholders 104a-104n may also use corresponding cardholder devices (see, 130a, 130b . . . 130n) to perform payment transactions. The cardholder device 130 may be a smartphone, a tablet, a laptop, a computer system, or any computing device. In an example, the cardholder device 130 may include a portable device such as a laptop, smart watch, PDA (personal digital assistant), smartphone, and the like. In another example embodiment, the cardholder device 130 may include a fixed device such as a desktop, workstation, and the like. In one embodiment, the cardholder 104 may perform payment transactions at Point of Interaction (POI) terminals either through the payment card 106 or the cardholder device 130. Examples of the POI terminals may include, but are not limited to, merchant terminals (e.g., Point-of-sale (POS) device) associated with merchants, ATM terminals, mobile applications, crypto-wallet applications (see, 128), etc.

In one embodiment, the issuer server 116 is a financial institution that manages accounts of multiple cardholders (e.g., the cardholder 104). In addition, account details of the payment accounts established with the issuer bank are stored in cardholder profiles of the cardholders in memory of the issuer server 116 or on a cloud server associated with the issuer server 116. The terms "issuer server", "issuer", or "issuing bank" will be used interchangeably herein. The issuer server 116 approves or declines an authorization request, and then routes, via the payment network 114, an authorization response back to the acquirer server 120. The acquirer server 120 sends the approval message to the merchant 108.

The merchant 108 may be an individual, representative of a corporate entity, non-profit organization, any medical facilities (e.g., hospitals, laboratories, etc.), financial institutions, educational institutions, retail shops, restaurants, supermarkets or establishments, government and/or private agencies, or any such place where cardholders visit for performing financial transactions in exchange for any goods and/or services or any transaction that requires financial transaction between the payment account associated with the cardholder 104 and the payment account associated with the merchant 108. The merchant 108 may be associated with a merchant terminal that enables cardholders to perform financial transactions. The merchant terminal is associated with a unique merchant identifier (MID). Examples of the merchant terminal may include Point-Of-Sale (POS) devices, Point-Of-Purchase (POP) devices, or the like.

In one non-limiting example (not in accordance with embodiments of the present disclosure), the cardholder 104 performs a payment transaction via a merchant terminal using the information of a primary account number (PAN) and/or a payment card 106 associated therewith to purchase goods or services offered by a merchant (e.g., the merchant 108). In one scenario, it might be possible that the merchant 108 is a common point of purchase (CPP) compromised merchant and due to that, sensitive information of the cardholder may be stolen without stealing the payment card 106 of the cardholder 104. After some point of time, when the cardholder 104 finds that the payment card 106 is compromised, the cardholder 104 may ask the issuer server 116 to block the previous payment card 106 and reissue a payment card 106 for the cardholder 104. Thus, a lot of banking resources associated with the issuer server 116 is consumed for reissuing the payment card 106 to the cardholder 104. Further, it is observed that the issuer server 116 does not have any visibility about potential cardholders that will most likely need to be reissued due to future fraud at different merchants.

To overcome the above-mentioned limitations, the environment 100 includes the server system 102 (i.e., a risk prediction system) that is configured to predict a plurality of account-level risk scores associated with the cardholder 104 based at least on merchant risk profiles of merchants who have interacted with the cardholder 104 and a plurality of machine learning models. Thereafter, the server system 102 is configured to send a recommendation message to the issuer server 116 to perform one or more downstream tasks based at least on the plurality of account-level risk scores associated with the cardholder 104.

The plurality of account-level risk scores may include one or more of: (a) an account or card reissuance risk score, and (b) a transaction channel risk score. The account or card reissuance risk score may indicate a probability of a payment card 106 requiring re-issue due to fraud within a prediction window (e.g., 3 months). In other words, the account reissuance risk score may indicate a likelihood of a compromised account requiring to have its payment card 106 reissued due to fraud in the next 3 months.

The transaction channel risk score may indicate a propensity of the cardholder 104 to interact with a risky merchant within the prediction window. In other words, the transaction channel risk score may indicate a likelihood of an account transacting in a risky merchant category or channel in the next 3 months.

Based on account-level risk scores for the plurality of cardholders 104a-104n, the server system 102 may generate recommendations (e.g., cardholder risk reports) that would help the issuer server 116 in identifying which payment accounts have faced a data breach and would need to be reissued, a number of payment cards that would potentially be reissued in the future or likely to transact in a risky merchant, a cardholder segment that is more likely to transact at a risky merchant, etc.

In one embodiment, the server system 102 may implement an account reissuance risk model 122 and a transaction channel risk model 124 to determine the account reissuance risk score and the transaction channel risk score of the cardholder 104, respectively. The server system 102, in communication with the issuer server 116/the payment server 112, is configured to compute the plurality of account-level risk scores of the cardholder 104 on a periodic basis and transmit the plurality of account-level risk scores to the issuer server 116 so that any remedial action can be taken to mitigate fraud occurrence.

In one embodiment, the server system 102 coupled with a database 118 is embodied within the payment server 112, however, in other examples, the server system 102 can be a standalone component (acting as a hub) connected to the issuer server 116. The database 118 may store the account reissuance risk model 122 and the transaction channel risk model 124. The database 118 may be incorporated in the server system 102 or may be an individual entity connected to the server system 102 or may be a database stored in cloud storage.

The account reissuance risk model 122 identifies payment cards that are at most risk, so the issuer 116 can expedite the reissuance of payment card 106 to prevent the anticipated fraud. Further, among payment cards that either have been exposed or are at risk of exposure, the account reissuance risk model 122 identifies the payment cards that are most likely to need to be reissued due to future fraud and generates account reissuance risk scores accordingly.

The transaction channel risk model 124 determines a common point of purchase (CPP), a likely merchant location where credit card numbers were stolen in order to mitigate future fraud on accounts likely to transact there in the future. The transaction channel risk model 124 determines the location or processor where a payment card number was stolen and identifies them as the high-risk merchant and generates a transaction channel risk score to proactively identify payment cards that are the most at risk of future compromise by indicating a likelihood to transact in a risky location. The transaction channel risk score leverages a global network of data that can provide additional insight and benefit to issuers and allow them to feel more confident in identifying cardholders who truly are at risk of being compromised in a subsequent time period (i.e., the future).

The server system 102 is a separate part of the environment 100 and may operate apart from (but still in communication with, for example, via the network 126) any third party external servers (to access data to perform the various operations described herein). However, in other embodiments, the server system 102 may be incorporated, in whole or in part, into one or more parts of the environment 100. In addition, the server system 102 should be understood to be embodied in at least one computing device in communication with the network 126, which may be specifically configured, via executable instructions, to perform steps as described herein, and/or embodied in at least one non-transitory computer-readable media.

In one embodiment, the transaction database 110 stores information of past payment transactions performed by the plurality of cardholders 104a-104n at merchants. For example, the transaction database 110 may store authorization data and fraud risk data of the cardholders. The transaction database 110 may also store historical credit risk scores associated with primary account numbers of the cardholders. This information may be transmitted to another computing device, for example, the server system 102 described herein according to various example embodiments.

In one embodiment, the payment network 114 may be used by the payment card 106 issuing authorities as a payment interchange network. The payment network 114 may include a plurality of payment servers such as the payment server 112. Examples of payment interchange network include, but are not limited to, Mastercard® payment system interchange network. The Mastercard® payment system interchange network is a proprietary communications standard promulgated by Mastercard International Incorporated® for the exchange of financial transactions among a plurality of financial activities that are members of Mastercard International Incorporated®. (Mastercard is a registered trademark of Mastercard International Incorporated located in Purchase, N.Y.).

The number and arrangement of systems, devices, and/or networks shown in FIG. 1A are provided as an example. There may be additional systems, devices, and/or networks; fewer systems, devices, and/or networks; different systems, devices, and/or networks; and/or differently arranged systems, devices, and/or networks than those shown in FIG. 1A. Furthermore, two or more systems or devices shown in FIG. 1A may be implemented within a single system or device, or a single system or device shown in FIG. 1A may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 1B:
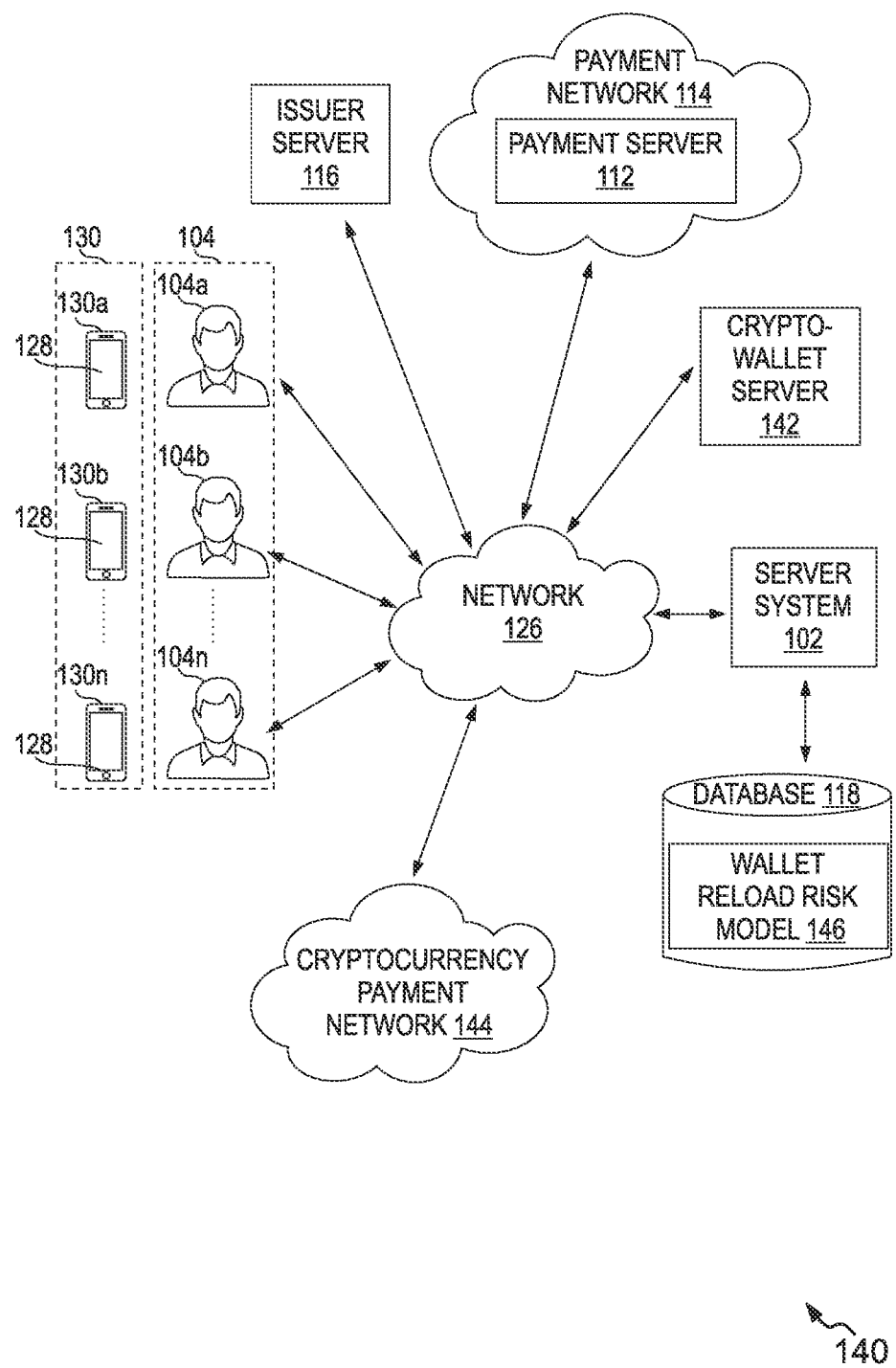
FIG. 1B is an example representation of another environment, related to at least some example embodiments of the present disclosure.

FIG. 1B illustrates an exemplary representation of another environment 140 related to at least some example embodiments of the present disclosure. Although the environment 140 is presented in one arrangement, other embodiments may include the parts of the environment 140 (or other parts) arranged otherwise depending on, for example, determining an account-level risk score of a cardholder. Some of the entities in the environment 140 are similar to entities mentioned in the environment 100 and, therefore, for the sake of brevity, these entities are not explained herein in detail.

The environment 140, in addition to the environment 100, may include a crypto-wallet server 142 and a cryptocurrency payment network 144, each coupled to, and in communication with (and/or with access to) the network 126.

In one embodiment, the cardholder device 130 is installed with a crypto-wallet application 128 (e.g., Web browser, mobile application) that is configured to exchange fiat currency transaction amounts into cryptocurrency transaction amounts. The crypto-wallet application 128 is controlled or managed by a backend server i.e., a crypto-wallet server 142. The crypto-wallet server 142 is a centralized server that stores account details of a payment account of the cardholder 104 and details of the cardholder brokerage account in which the cardholder 104 loads the money.

In one embodiment, the crypto-wallet server 142 is configured to perform cryptocurrency purchases by communicating with the crypto-currency payment network 144. The crypto-wallet server 142 provides an infrastructure that facilitates cryptocurrency purchases.

In one non-limiting example (not in accordance with embodiments of the present disclosure), the cardholder 104 loads money into a set of crypto-wallet applications using the information of a primary account number (PAN) and/or a payment card 106 associated therewith to purchase cryptocurrencies offered by the set of crypto-wallet applications. Since the set of crypto-wallet applications is vulnerable to fraudulent activities, it might be possible that a crypto-wallet application is compromised and due to that, the cardholder may lose all the money from the crypto-wallet application. Thus, there is a need for a system that can predict cardholders who may make wallet reload transactions with crypto-wallets that have high fraud risk exposure.

To overcome the above-mentioned limitations, the environment 140 includes the server system 102 (i.e., a risk prediction system) that is configured to predict an account-level risk score (e.g., wallet reload risk score) associated with the cardholder 104 based at least on wallet transaction features of the crypto-wallets with which the cardholder 104 has interacted.

The server system 102 is configured to determine a wallet reload risk score associated with the cardholder 104 based on a wallet reload risk model 146 that is trained based on historical authorization and fraud risk data of past wallet reload transactions of the cardholder 104. The server system 102 is configured to predict a probability of risk associated with the cardholder 104 reloading transaction amount into a risky/fraudulent crypto-wallet.

In one embodiment, the cryptocurrency payment network 144 is a peer-to-peer payment network that operates on a cryptographic protocol. The cryptocurrency payment network 144 may be based on blockchain-based networks such as bitcoin™, Ethereum™, and be used by a crypto-wallet application 128 (i.e., financial entities) to perform various cryptocurrency based transactions.

The number and arrangement of systems, devices, and/or networks shown in FIG. 1B are provided as an example. There may be additional systems, devices, and/or networks; fewer systems, devices, and/or networks; different systems, devices, and/or networks; and/or differently arranged systems, devices, and/or networks than those shown in FIG. 1B. Furthermore, two or more systems or devices shown in FIG. 1B may be implemented within a single system or device, or a single system or device shown in FIG. 1B may be implemented as multiple, distributed systems or devices. Additionally, or alternatively, a set of systems (e.g., one or more systems) or a set of devices (e.g., one or more devices) of the environment 140 may perform one or more functions described as being performed by another set of systems or another set of devices of the environment 140. It should be noted that the functionalities of the server system can also be implemented in a standalone system, partially or in entirety.

Figure 2:
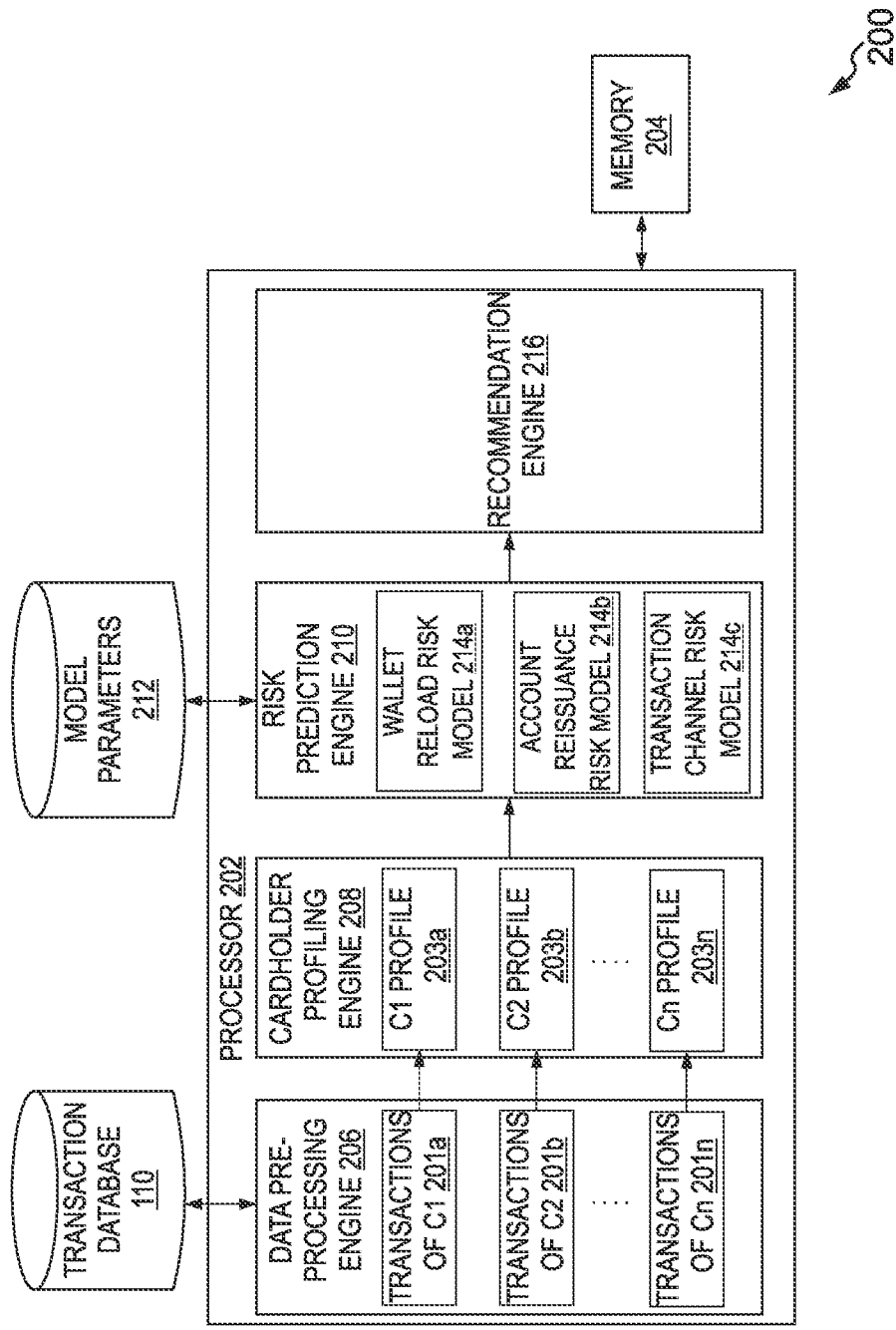
FIG. 2 shows a block diagram of a risk prediction system, in accordance with one embodiment of the present disclosure.

Referring now to FIG. 2, a simplified block diagram of a risk prediction system 200 is shown, in accordance with an embodiment of the present disclosure. In some embodiments, the risk prediction system 200 is similar to the server system 102. In some embodiments, the risk prediction system 200 is embodied as a cloud-based and/or SaaS-based (Software as a Service) architecture.

In one embodiment, the risk prediction system 200 determines a plurality of account-level risk scores associated with a cardholder (e.g., cardholder 104a) and transmits a recommendation message to the issuer server 116 associated with the cardholder 104a to perform one or more downstream tasks based at least on the determined account-level risk scores. The account-level risk score indicates a likelihood of involving the cardholder 104 in fraudulent activities. The account-level risk scores may be determined based, at least in part, on merchant activity of a plurality of merchants/crypto-wallet applications with which the cardholder 104 has interacted. The account-level risk scores may include, for example, a wallet reload risk score, an account reissuance risk score, a transaction channel risk score, etc.

In one embodiment, the risk prediction system 200 includes a processor 202 and a memory 204 including computer-readable instructions causing the processor 202 to execute operations of the risk prediction system 200.

The processor 202 includes suitable logic, circuitry, and/or interfaces to execute computer-readable instructions for determining a plurality of account-level risk scores associated with a cardholder. Examples of the processor 202 include, but are not limited to, an application-specific integrated circuit (ASIC) processor, a reduced instruction set computing (RISC) processor, a complex instruction set computing (CISC) processor, a graphical processing unit (GPU) processor, a field-programmable gate array (FPGA), and the like. The memory 204 includes suitable logic, circuitry, and/or interfaces to store a set of computer-readable instructions for performing operations. Examples of the memory 204 include a random-access memory (RAM), a read-only memory (ROM), a removable storage drive, a hard disk drive (HDD), and the like. It will be apparent to a person skilled in the art that the scope of the disclosure is not limited to realizing the memory 204 in the risk prediction system 200, as described herein. In another embodiment, the memory 204 may be realized in the form of a database server or cloud storage working in conjunction with the risk prediction system 200, without departing from the scope of the present disclosure.

In one embodiment, the processor 202 includes a data pre-processing engine 206, a cardholder profiling engine 208, a risk prediction engine 210, and a recommendation engine 216. It should be noted that the components, described herein, can be configured in a variety of ways, including electronic circuitries, digital arithmetic and logic blocks, and memory systems in combination with software, firmware, and embedded technologies.

The data pre-processing engine 206 includes suitable logic and/or interfaces for accessing or extracting payment transaction data and cardholder risk data associated with the cardholder 104 from the transaction database 110. In particular, the data pre-processing engine 206 may query the transaction database 110 for past payment transactions of the cardholder 104 based on an account identifier of the cardholder 104. In one embodiment, the data pre-processing engine 206 may obtain the payment transaction data associated with the cardholder 104 from the issuer server 116. Further, the data pre-processing engine 206 may obtain the cardholder risk data (e.g., credit risk score, fraud risk score, etc.) from the payment server 112. The payment transaction data includes a set of transaction variables corresponding to the past payment transactions performed by the cardholder 104 at one or more Point of Interaction (POI) terminals within a particular time window. In an example, the predetermined time period may include 3 months, 6 months, 9 months, 1 year, and the like. In one implementation, the cardholder 104 can perform the past payment transactions at the POI terminals (e.g., merchant terminals, POS terminals, crypto-wallet applications, etc.).

Each payment transaction may be associated with a plurality of transaction variables. The plurality of transaction variables includes, but is not limited to, a unique merchant identifier, transaction amount, transaction currency, wallet identifier when a payment transaction is performed at the crypto-wallet application, card product type, e-commerce indicator, contactless payment indicator, recurring payment transaction indicator, user presence indicator, cross-border transaction indicator, POI terminal type indicator (e.g., crypto-wallet application, merchant terminal), payment transaction type indicator, number of spend transactions at the one or more POI terminals within the particular time window, authorization data, and fraud risk data. In some embodiments, the plurality of transaction variables associated with past payment transactions performed at one or more POI terminals may further include (a) number and amount of cross-border payment transactions and declined transactions, (b) number and amount of payment transactions performed in risky countries, its various merchant category codes (MCCs), and industry, and (c) number and amount of transactions performed in non-risky countries, its various MCC's, and industry.

In one embodiment, the data pre-processing engine 206 is configured to filter out or identify crypto-wallet reload transactions performed by the cardholder 104 based at least on the merchant category code (MCC) and transaction type identifier of the past payment transactions. The crypto-wallet reload transactions are used for generating wallet transactions features corresponding to crypto-wallets.

In some embodiments, the data pre-processing engine 206 is configured to determine merchant risk profiles of the plurality of merchants 108. Since account reissuance risk scores may depend upon merchant risk profiles of the plurality of merchants 108, the data pre-processing engine 206 is configured to access information of all payment cards that have transacted at the identified plurality of merchants 108 based on the location of the identified plurality of merchants 108. Furthermore, the data pre-processing engine 206 is configured to access a number of total payment cards and a number of fraudulent payment cards at each merchant of the plurality of merchants 108.

In some embodiments, the data pre-processing engine 206 is configured to perform operations (such as data-cleaning, normalization, feature extraction, and the like) on the past payment transactions. Thereafter, the data pre-processing engine 206 is configured to transmit the plurality of transaction variables associated with each payment transaction to the cardholder profiling engine 208.

In some embodiments, the data pre-processing engine 206 may access historical transaction data of cardholders based on various criteria for training the account reissuance risk model 122, the transaction channel risk model 124, and the wallet reload risk model 146. The data pre-processing engine 206 may divide the historical transaction data into training data and validation data.

The cardholder profiling engine 208 includes suitable logic and/or interfaces for generating or deriving cardholder profile data of the cardholder 104 based, at least in part, on the plurality of transaction variables of each payment transaction associated with the cardholder 104. The cardholder profile data may include at least: (a) wallet transaction features associated with the crypto-currency wallets, (b) spend behavioral pattern features of the cardholder for the merchant terminals, and (c) cardholder transaction features according to merchant risk profiles.

The wallet transaction features associated with the crypto-wallets may be determined from or engineered after identifications of payment transactions of the cardholder 104 that are performed for reloading cardholder brokerages accounts of the crypto-wallets. The wallet transaction features may include categorical or numerical features. In one embodiment, the wallet transaction features may include card-present/card-not present flag, transaction decline count, transaction decline amount, credit risk scores of wallet reload transactions, and the like. In one non-limiting example, the crypto-wallet related payment transactions are identified by filtering transaction data fields of cardholder payment transactions with the MCC code as "6051" and payment transaction type identifier as "70".

To derive the spend behavioral pattern features for the merchant terminals, the cardholder profiling engine 208 may apply CPP detection models to determine the CPP compromise risk scores of the merchants where the cardholder 104 has performed the payment transactions. These CPP compromise risk scores are used as one of the features in the spend behavioral pattern features.

The spend behavioral pattern features may include merchant features (e.g., CPP compromise risk scores of top five risky merchant industries/countries/regions, percentage distribution of contactless payment transactions or chip-based payment transactions at the top five risky merchant industries/countries/regions), cardholder interaction features with breached/testing/fraud merchants, cardholder risk features (e.g., credit risk scores, fraud risk score at transaction level, etc.), payment network related risk features, and the like. The spend behavioral pattern features may also include a maximum probability of utilization of a payment card 106 at each merchant, a number of merchants over 10-100K ranks from each merchant source, a number of merchants transacted by the cardholder 104 with the same payment card 106, transaction approval rate in the last time period, transaction decline reasons at account level. The payment network related risk features may indicate a probability of occurring network failure at the payment network 114.

The cardholder transaction features may include card spending in top risky MCC or industry or country, transaction level features like transaction amount, transaction count, card on file transactions, e-commerce/recurring transactions, and contactless transactions, card activity features, number and amount of transactions in non-risky country, MCC, or industry, etc. The top risky MCCs, industry, or country is calculated by checking the number of CPPs that emerge from each category (e.g., MCC, industry, country) historically. For example, Brazil is a high-risk country since it has a large number of merchants that were CPP compromised in 2019.

In one example, the cardholder profiling engine 208 may include a machine learning model such as, but not limited to, Linear Discriminant Analysis (LDA) model, Independent Component Analysis (ICA) model, or Principal Component Analysis (PCA) model to generate the cardholder profile data.

In one example, the cardholder profiling engine 208 may use natural language processing (NLP) algorithms to generate the cardholder profile data from the plurality of transaction variables. It is to be noted that the above-stated cardholder profile data proved to be very effective for predicting a potential future compromise at the merchant point of interaction. In some implementations, the wallet transaction features, the spend behavioral pattern features, and the cardholder transaction features may be converted into vectors to be fed as inputs to various account-level risk models.

The risk prediction engine 210 includes suitable logic and/or interfaces for determining a plurality of account-level risk scores associated with the cardholder 104 based, at least in part, on the cardholder profile data. Each account-level risk score of the plurality of account-level risk scores is determined by a trained machine learning model. The plurality of account-level risk scores may include: (a) a wallet reload risk score, (b) an account reissuance risk score, and (c) a transaction channel risk score. The risk prediction engine 210 may implement a wallet reload risk model 214a, an account reissuance risk model 214b, and a transaction channel risk model 214c to determine the plurality of account-level risk scores. In one example, the trained machine learning model is the gradient boosted classification model.

In one embodiment, the wallet reload risk model 214a handles classification of multiple classes through one model. The wallet reload risk model 214a is initially trained by accessing the corresponding model parameters (see, 212). In one non-limiting example, the wallet reload risk model 214a is based on a gradient boosting decision tree (GBDT) based classification model. The training data may include historical authorization and fraud tables of wallet reload transactions performed for different crypto-wallets by cardholders within a particular time period. In one embodiment, the wallet reload risk model 214a determines the probability of likelihood of the cardholder 104 performing a high-risk wallet reload transaction in a crypto-wallet intended to perform a cryptocurrency purchase. In one example, the wallet reload risk score ranges between 0-900. The wallet reload transaction is said to be a high-risk crypto transaction, when the wallet reload risk score associated with the wallet reload transaction is greater than a predetermined threshold value (i.e., 700).

The account reissuance risk model 214b is configured to determine an account reissuance risk score associated with the cardholder 104 within a particular time interval. In one non-limiting example, the account reissuance risk model 214b is based on a gradient boosting decision tree (GBDT) based classification model and is trained according to the model parameters 212 (e.g., ntree: 100, max depth: 10, learning rate: 0.075).

In a similar manner, the transaction channel risk model 214c is configured to determine a transaction channel risk score associated with the cardholder 104. In one non-limiting example, the transaction channel risk model 214c is based on a gradient boosting decision tree (GBDT) based classification model and is trained according to the model parameters 212 (e.g., ntree: 143, max depth: 10, learning rate: 0.04). The transaction channel risk model 214c is configured to classify payment transactions into risky merchant transactions and non-risky merchant transactions in a pre-determined time period based on a binary classification model. The transaction channel risk model 214c is further configured to generate a transaction channel risk score associated with the cardholder for risky merchants based on the classification. The transaction channel risk score indicates a probability of the payment card 106 associated with the cardholder 104 being compromised while transacting with a risky merchant terminal in a subsequent time period. In another embodiment, the transaction channel risk model 214c determines a probability of the payment card 106 associated with the cardholder 104 being compromised while transacting with a risky merchant in the future.

In general, the GBDT based classification model is a machine learning technique used for optimizing the predictive value of a model through successive steps in the learning process. More specifically, the GBDT based classification model utilizes simpler (weak) prediction models sequentially, where each model tries to optimize errors left over by the previous model. The GBDT based classification model is generally used to solve prediction problems in the classification and regression domains. Decision trees may be well worked for such predictions because they handle mixed variable types well (e.g., categorical and numerical), they require little data preparation (e.g., no need to create dummy variables to shift the outcome), and they perform well with large data sets.

The recommendation engine 216 includes suitable logic and/or interfaces for transmitting a recommendation message to the issuer server 116 associated with the cardholder 104 based, at least in part, on the plurality of account-level risk scores. The recommendation message consists of a recommendation to the issuer server 116 to take necessary actions on the future payment transactions based on account-level risk scores generated by the various risk prediction models of the risk prediction engine 210. In one implementation, the recommendation engine 216 may transmit recommendations or alerts to the issuer server 116 for the cardholder 104 that are expected to transact with risky wallets or merchants in the future. In one example, the recommendation engine 216 may transmit the recommendations or alerts in real-time when the cardholder 104 is performing the payment/wallet transactions.

In one example, the data pre-processing engine 206 receives transactions of cardholder C1 (see, 201a), transactions of cardholder C2 (see, 201b) . . . transactions of cardholder Cn (see, 201n). The data pre-processing engine 206 further pre-processes the various transactions and then cardholder profiling engine 208 generates a plurality of cardholder profiles such as C1 profile (see, 203a), C2 profile (see, 203b) . . . Cn profile (see, 203n). Each cardholder profile of the plurality of cardholder profiles is associated with one single cardholder.

Figure 3:
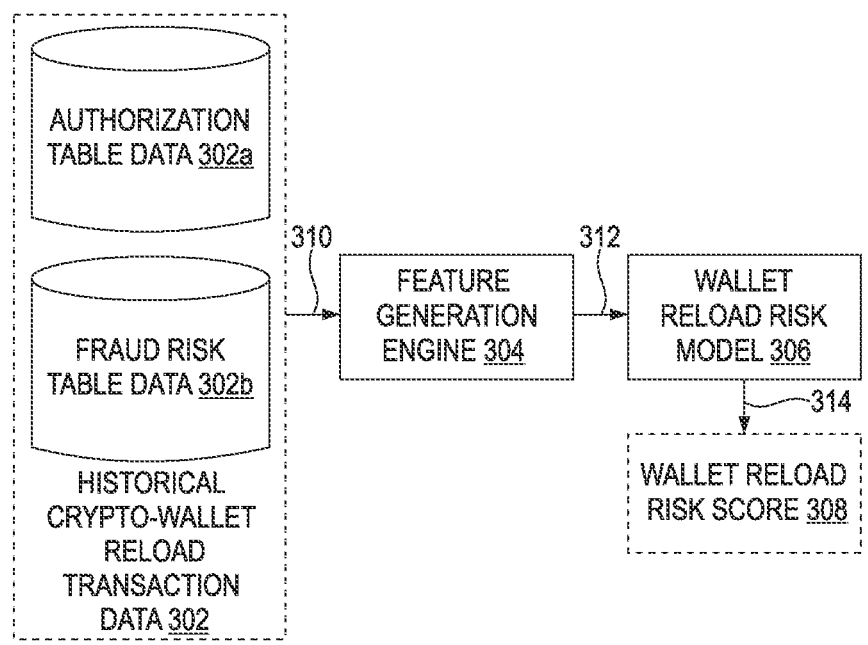
FIG. 3 shows a schematic block diagram representation for predicting a wallet reload risk score associated with a cardholder, in accordance with an embodiment of the present disclosure.

FIG. 3 shows a block diagram representation 300 for predicting a wallet reload risk score associated with a cardholder, in accordance with an embodiment of the present disclosure. As shown in the FIG. 1B, the server system 102 implements a wallet reload risk model 146 that is configured to predict a likelihood of a payment account to make one or more cryptocurrency purchases with a high risk of fraud within a subsequent time period (e.g., the next 3 months). In other words, the wallet reload risk model 146 is configured to predict a risk associated with crypto-wallet reload transactions with a crypto-wallet application 128 installed or accessible on the cardholder device 130.

At first, the server system 102 may access historical crypto-wallet reload transaction data 302 corresponding to the cardholder 104 and provide it as an input to a feature generation engine 304 that is included in a processor of the server system 102 (see, 310). The historical crypto-wallet transaction data may include authorization table data 302a and fraud risk table data 302b of past crypto-wallet reload payment transactions of the cardholder 104. In one embodiment, the authorization table data 302a consists of authorization data associated with the past crypto-wallet reload payment transactions of the cardholder 104 and card-level data associated with the payment card 106 of the cardholder 104. For example, suppose, a cardholder 'A' has installed 3 different crypto-wallet applications on his/her mobile phone. The cardholder 'A' has performed a hundred crypto-wallet reload or recharge transactions using his/her payment card details. In this scenario, the historical crypto-wallet reload transaction data 302 may include authorization and fraud risk data associated with the hundred crypto-wallet reload transactions.

Based on the authorization data and the card-level data, the feature generation engine 304 may determine transaction patterns such as the authorization status of the payment transactions, the transaction amount spent in the past 3, 6, 9, and 12 months, the transaction count in the past 3, 6, 9, and 12 months, average amount spends per month, an average number of transactions per month, cardholder spending across different crypto-wallets, etc. The feature generation engine 304 may also determine credit risk scores of the past crypto-wallet reload payment transactions based on the fraud risk table data 302b. The credit risk score associated with the cardholder 104 is fetched from a credit risk scoring system of a payment server.

Thus, the feature generation engine 304 is configured to generate wallet transaction features associated with each crypto-wallet at which the cardholder 104 has loaded the money. The wallet transaction features may include, but are not limited to, wallet-specific features (e.g., fraud risk associated with a crypto-wallet, cardholder profiles based on an aggregation of wallet risk profiles according to fraud risk scores of wallet reload transactions at different crypto-wallets, etc.), cardholder features (e.g., target encoding of bank identification number (BIN) and issuer ID of the cardholder), risk features of crypto-currencies available on the crypto-wallet.

In one embodiment, the feature generation engine 304 may generate a network graph based, at least in part, on crypto-wallet reload transactions of cardholders 104a-104n with different crypto-wallets. The network graph represents a computer-based graphical representation of the cardholders (e.g., the cardholder 104a) as first nodes and crypto-wallets (e.g., the crypto-wallet application 128) as second nodes and relationships between the first nodes and the second nodes as edges. In an example, the network graph can be a directed graph, a bipartite graph, an attributed heterogeneous graph, and the like. The feature generation engine 304 may generate graphical wallet features associated with each crypto-wallet based on a graph neural network (GNN). The graphical wallet features are included in the wallet transaction features. Thus, the feature generation engine 304 generates wallet transaction features not only based on individual features of the cardholder 104 but also based on features of different crypto-wallets at which the cardholder 104 transacted in the past. Consequently, the feature generation engine 304 is configured to profile crypto-wallets and use them to profile the cardholder 104 to enrich the feature space.

The feature generation engine 304 provides the wallet transaction features of each crypto-wallet with which the cardholder 104 has interacted, to a wallet reload risk model 306 (see, 312). The wallet reload risk model 306 is a classification model that is configured to predict a likelihood of the cardholder 104 performing risky wallet transactions with a crypto-wallet in the subsequent time period. In particular, the wallet reload risk model 306 is trained based on the gradient boosting decision tree (GBDT) algorithm.

In one embodiment, the wallet reload risk model 306 determines a wallet reload risk score 308 with each crypto-wallet for the cardholder 104 (see, 314). The wallet reload risk score 308 indicates the likelihood of the cardholder 104 performing a fraudulent crypto-wallet transaction in the subsequent time period. In other words, the wallet reload risk score 308 indicates a risk in reloading money into a crypto-wallet associated with the cardholder 104. In an example, a set of wallet reload risk scores computed for different time periods indicates the probabilities of the cardholder 104 to perform a fraudulent crypto-wallet transaction within the different time periods (e.g., the next 3, 6, 9, and 12 months time period). The wallet reload risk model 306 classifies the cardholder 104 doing high risky crypto-wallet transactions when a wallet reload risk score of the cardholder 104 with a particular crypto-wallet is greater than a predetermined threshold value. In other words, when a wallet reload risk score for wallet reload transactions with a crypto-wallet within a particular time interval is at least equal to (i.e., greater than or equal to) a predefined threshold value, the wallet reload risk model 306 may assign a value '1' for risky cardholder with cryptocurrency purchases.

In one embodiment, the issuer server 116, based on the generated wallet reload risk score 308, authorizes or declines the reloading money in the crypto-wallet associated with the cardholder 104. Thus, the issuers may be facilitated to take proactive actions such as increasing authentication for transactions on payment cards that are likely to experience fraud during a crypto-wallet reload transaction.

In one embodiment, the server system 102 trains a single model (e.g., a binary classification model) via gradient boosting techniques to predict the likelihood of the cardholder 104 to perform a high-risk crypto-wallet reload transaction.

In one implementation, the wallet reload risk model 306 is a gradient boosting decision tree (GBDT) based classification model. The GBDT technique for training a model is a type of supervised learning used for machine-learning techniques. The supervised learning may be used to infer a function from labeled training data consisting of a set of training examples. In supervised learning, each training example is a pair consisting of an input object (typically a vector) and the desired output value.

The GBDT technique can be used for classification and regression problems. The gradient boosting decision tree-based model utilizes regression trees where a target variable can take continuous values (typically real numbers). For example, the target variable may be the likelihood of the cardholder 104 to perform a fraudulent crypto-wallet transaction within a subsequent time period. Gradient boosting decisions trees are represented as a tree-like set of nodes forming a branch-like structure, in which each internal node represents a "test" on an attribute (e.g., if the age of a person is greater than or equal to 18), each branch represents the outcome of the test, and each leaf node represents a numerical score that is mapped to a class label (decision taken after computing all attributes). The paths from a root node to a leaf node represent classification rules. Gradient boosting decision trees may be used to reach a conclusion or predict an event or outcome given the input. In general, algorithms for constructing decision trees usually work top-down, by choosing a variable at each node or step that best splits the set of items or observations. Different algorithms use different metrics for measuring the best split, but these algorithms generally measure the homogeneity of the target value within the subset of observations. The metrics are applied to each candidate subset and the resulting values are combined (e.g., averaged) to provide a measure of the quality of the split. For example, an algorithm to make a locally optimal decision at each node or step with the goal of finding a global optimum (e.g., a greedy algorithm) is a common strategy for learning decision trees from training data (e.g., historical transaction data). Examples of gradient boosting decision trees include FastTree, XGBoost, AdaBoost, etc.

The training data used for the GBDT-based classification model may include, but is not limited to, wallet transaction features of historical payment transactions performed by the cardholder 104. The historical payment transactions may include payment transactions of a particular time period. The wallet transaction features and wallet transaction labels are fed as inputs to the wallet reload risk model 306 (i.e., GBDT-based classification model).

The GBDT-based classification model is trained based on the aggregated vector and the corresponding wallet transaction labels. The GBDT-based classification model is trained until a loss function (e.g., cross-entropy (CE) loss function) reaches a predetermined threshold value.

Figure 4:
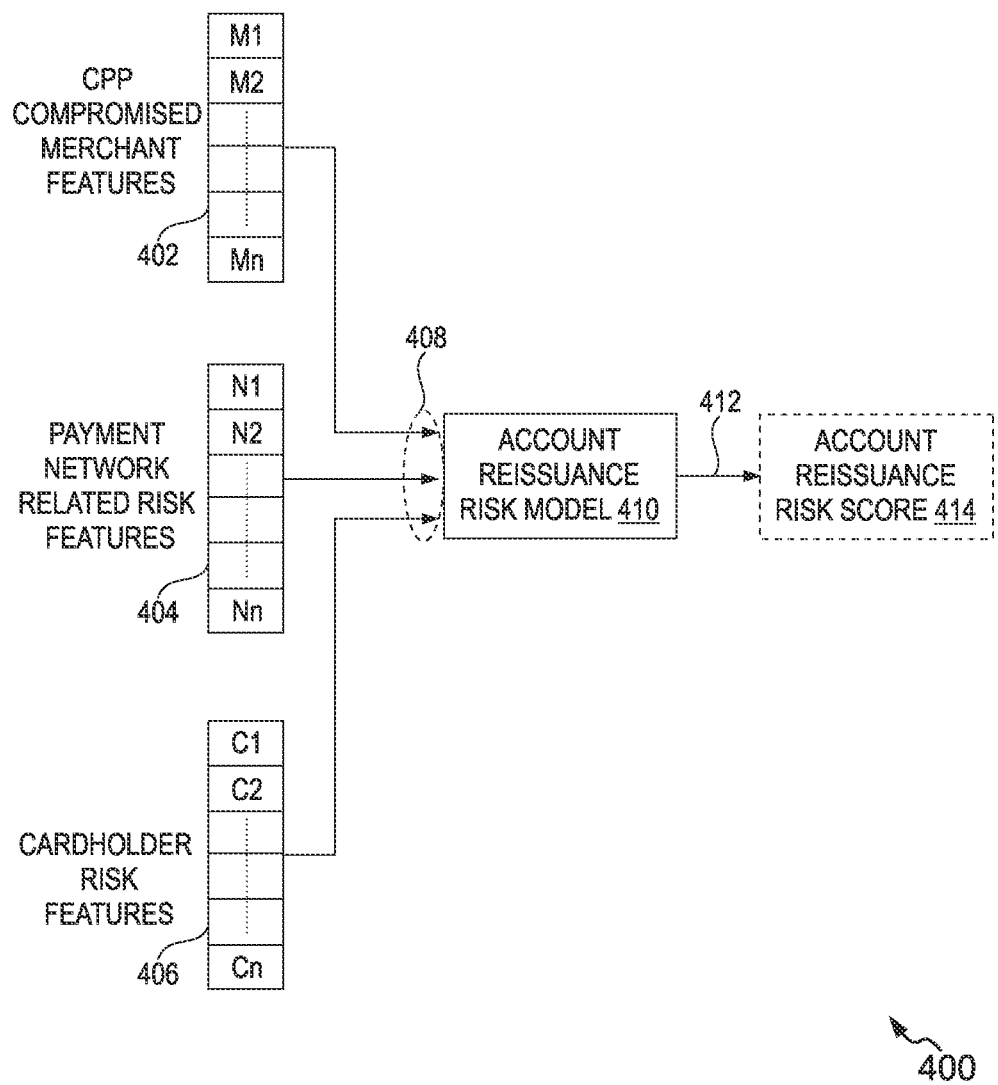
FIG. 4 shows a schematic block diagram representation for determining account an reissuance risk score associated with a cardholder, in accordance with an embodiment of the present disclosure.

FIG. 4 shows a schematic block diagram representation 400 for determining an account reissuance risk score for a cardholder, in accordance with an embodiment of the present disclosure.

As mentioned earlier, the server system 102 implements an account reissuance risk model 122 for determining an account reissuance risk score of the cardholder 104 within a particular time interval. The account reissuance risk score indicates a likelihood of a compromised payment account to need to have its payment card reissued due to fraud within the particular time interval. In other words, the account reissuance risk score indicates a probability of the payment card of the cardholder 104 to be reissued within the particular time interval.

In one embodiment, the account reissuance risk model 122 is a machine learning or a neural network model. In one implementation, the account reissuance risk model 122 is a gradient boosting decision tree (GBDT) based classification model. The GBDT technique for training a model is a type of supervised learning used for machine-learning techniques. The supervised learning may be used to infer a function from labeled training data consisting of a set of training examples. In supervised learning, each training example is a pair consisting of an input object (typically a vector) and the desired output value. In one embodiment, the training data used for the GBDT based classification model may include, but is not limited to, transaction features of historical payment transactions performed by the plurality of cardholders. The historical payment transactions may include payment transactions of a particular time interval (for example, 3 years).

During the training phase, the server system 102 may first generate spend behavioral pattern features of the cardholder 104 based on historical payment transactions of the cardholder 104 with a plurality of merchants associated with merchant terminals. The historical payment transactions may be performed within a particular time frame (e.g., 2 years).

In one embodiment, the server system 102 may apply CPP detection models to determine CPP compromise risk scores of merchants where the cardholder 104 has performed the past payment transactions. Based on the CPP compromise risk scores, the server system may divide the plurality of merchants into one or more merchant classes such as: breached merchant, testing merchant, and high-risk merchant. The server system 102 may formulate the spend behavioral pattern features based on the CPP compromise risk scores of the plurality of merchants.

In an implementation, the spend behavioral pattern features may include CPP compromised merchant features represented as M1, M2, M3 . . . Mn (see, 402). In another implementation, the spend behavioral pattern features may include payment network related risk features represented as N1, N2, N3 . . . Nm (see, 404). In yet another implementation, the spend behavioral pattern features may include cardholder risk features represented as C1, C2, C3 . . . Cn (see, 406).

More illustratively, the spend behavioral pattern features may include (a) merchant features (e.g., CPP compromise risk scores of top five risky merchant industries/countries/regions, percentage distribution of contactless payment transactions or chip-based payment transactions at the top five risky merchant industries/countries/regions), (b) cardholder interaction features with breached/testing/fraud merchants (e.g., card approval rate with a merchant in last time, number of merchants where the payment card has been used, an interaction variable indicating interactions with breached/testing merchants, last timestamp of an interaction with breached/testing merchant, etc.), (c) cardholder risk features (e.g., credit risk scores, fraud risk scores, etc.), (d) payment network related risk features, and the like.

The spend behavioral pattern features may also include a maximum probability of utilization of a payment card 106 at each merchant, a number of merchants over 10-100K ranks from each merchant source, a number of merchants transacted by the cardholder 104 with the same payment card 106, transaction approval rate in the last time period, etc. The payment network related risk features may indicate a probability of occurring network failure at the payment network 114.

The merchant features, the payment network related risk features, and the cardholder risk features are aggregated together along with a corresponding risk label for training the account reissuance risk model 410 (see, 408). In one example, the CPP compromised merchant features, the payment network related risk features, and the cardholder risk features may also be represented in the form of a vector. More specifically, the CPP compromised merchant features, the payment network related risk features, and the cardholder risk features are aggregated together to form a vector along with the corresponding account reissuance risk label. The aggregated vector and the corresponding account reissuance risk label are fed as an input to the account reissuance risk model 410 (i.e., GBDT based classification model) (see, 408).

The GBDT based classification model is trained based on the aggregated vector and the corresponding account reissuance risk label. The GBDT based classification model (or any other supervised model) may be trained to predict a likelihood of whether a cardholder will request a card reissuance due to fraud in a forward-looking time (i.e., future time interval). Decision trees may be well worked for such predictions because they handle mixed variable types well (e.g., categorical and numerical), they require little data preparation (e.g., no need to create dummy variables to shift the outcome), and they perform well with large data sets.

The input into the GBDT based classification model may be formatted in a particular fashion, such as a vector format like $(x,Y)=(x1, x2, x3, \ldots, xk, Y)$, where the dependent variable, Y, is the target variable that corresponds to the input variables $x1, x2, x3, \ldots, xk$. For example, the target variable, Y, may be a probability of raising a chargeback request by a cardholder during a prediction period, and the input variables, $x1, x2, x3, \ldots, xk$, may include merchant features, the payment network related risk features, and the cardholder risk features, etc. Other arrangements and formats are also possible. The GBDT based classification model is trained until a loss function (e.g., cross-entropy (CE) loss function) reaches a predetermined threshold value.

During the execution phase, the account reissuance risk model 410 generates the account reissuance risk score 414 based on spend behavioral pattern features of the cardholder 104 of a particular time interval (e.g., last three months) (see, 412). The account reissuance risk scores help issuers in identifying cardholders whose accounts need to be reissued due to fraudulent merchant interactions.

This process helps the issuers save resources and money by prioritizing the cards to be reissued based on the likelihood of a payment card owned by the cardholder being fraudulent. This process caters to more technical advantages such as facilitating the identification of card types that have a higher likelihood of fraud transactions and finding solutions to make them more secure and reduction in overall credit card fraud.

Figure 5:
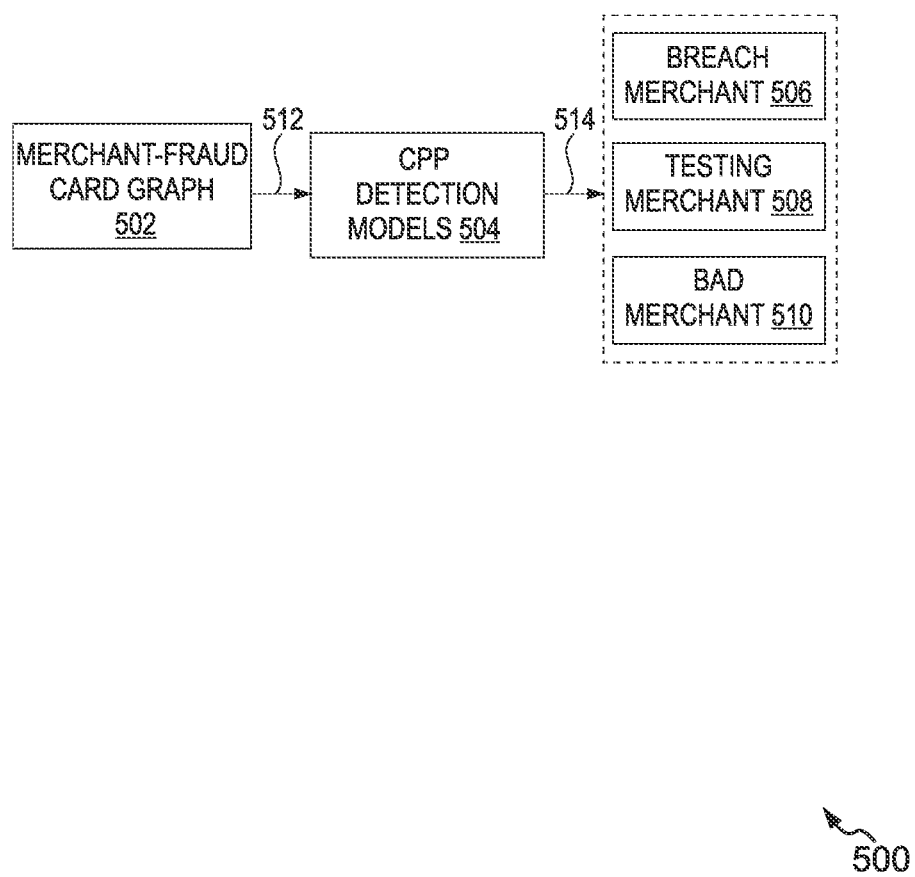
FIG. 5 shows a schematic block diagram representation for determining common point of purchase (CPP) compromised merchants, in accordance with an embodiment of the present disclosure.

FIG. 5 is a schematic block diagram representation 500 for classifying merchants into a set of merchant classes based on CPP compromise risk scores, in accordance with an embodiment of the present disclosure. As mentioned earlier, the server system 102 is configured to utilize CPP detection models to determine CPP compromise risk scores of merchant interacted with the cardholder 104.

To determine CPP compromise risk scores, the server system 102 is configured to define a merchant-fraud card graph 502 based at least on historical payment transaction data at a plurality of merchants. In one embodiment, the merchant-fraud card graph 502 may be a bipartite graph, attributed heterogeneous graph, and the like. The merchant-fraud card graph 502 represents fraudulent payment transactions performed by the cardholders at the plurality of merchants. In one embodiment, the server system is configured to generate a plurality of feature vectors corresponding to each of the plurality of merchants based, at least in part, on the historical payment transaction data.

Thereafter, the server system 102 is configured to provide a plurality of feature vectors corresponding to each of the plurality of merchants to CPP detection models (see, 512) and generate CPP compromise risk scores associated with the merchants based, at least in part, on the CPP detection models 504. In one embodiment, the CPP detection models

504 may include a prior-sub graph CPP model, Breach Radar CPP model, etc. Thereafter, the server system 102 is configured to divide the various top merchants into three different merchant classes based on the CPP compromise risk scores (see, 514). The three different merchant classes may be a breach merchant 506, a testing merchant 508, and a bad merchant 510 (i.e., high-risk merchant).

In one embodiment, the CPP detection models 504 determine a probability score of a merchant location to be a CPP location, and using this score, the CPP detection models identify the merchant location to be the CPP location. The CPP locations are the merchant locations where the cardholder's account or payment card details are leaked or compromised.

Further, based on the divided top merchants, the server system 102 generates risky merchant features based on the top merchants present in the three different merchant classes. The risky merchant features are further used as CPP compromised merchant features to train the account reissuance risk model 410.

Figure 6:
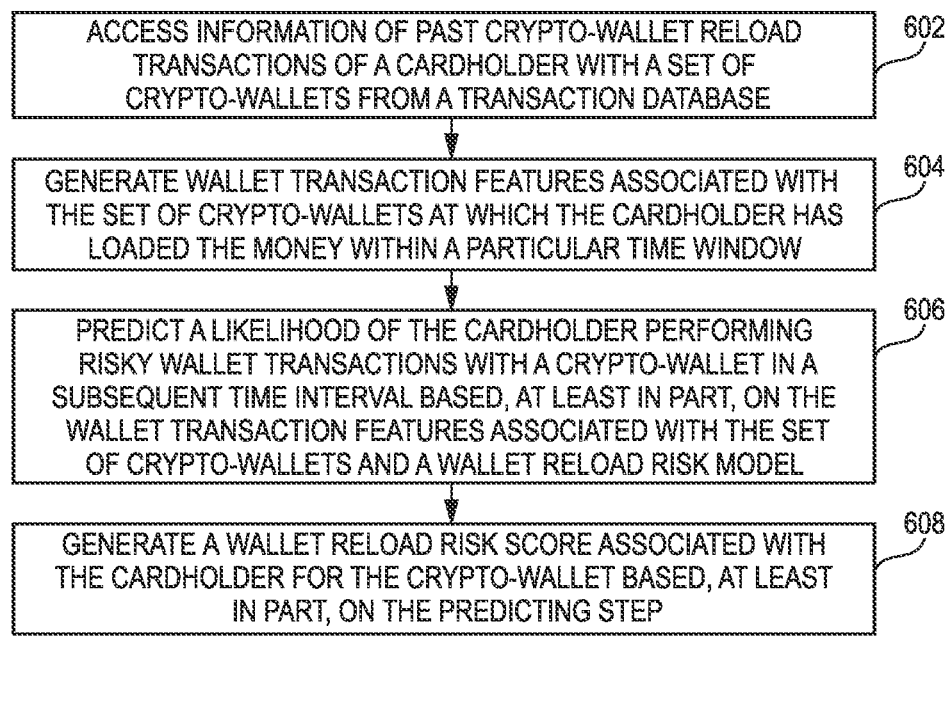
FIG. 6 is a flowchart for determining a wallet reload risk score for a cardholder, in accordance with an embodiment of the present disclosure.

FIG. 6 represents a flowchart 600 for determining a wallet reload risk score associated with a cardholder 104, in accordance with an embodiment of the present disclosure. The sequence of operations of the flowchart 600 may not be necessarily executed in the same order as they are presented. Further, one or more operations may be grouped together and performed in form of a single step, or one operation may have several sub-steps that may be performed in parallel or a sequential manner.

At step 602, the risk prediction system 200 accesses information of past crypto-wallet reload transactions of a cardholder 104 with a set of crypto-wallets from a transaction database 110. The information of the past crypto-wallet transactions may include authorization data and fraud risk data performed within a particular time window. The past crypto-wallet reload transactions performed at the set of crypto-wallets may include the number and amount of transactions performed at each crypto-wallet, payment channel types of the transactions, credit risk scores of the transactions, a number of approved and declined transactions, etc.

At 604, the risk prediction system 200 generates wallet transaction features associated with the set of crypto-wallets at which the cardholder 104 has loaded the money within a particular time window. The wallet transaction features may include, but are not limited to, wallet-specific features (e.g., risk associated with a crypto-wallet, cardholder profiles based on an aggregation of wallet risk profiles according to fraud risk scores of wallet reload transactions at different crypto-wallets, etc.), cardholder features (e.g., target encoding of bank identification number (BIN) and issuer ID of the cardholder), risk features of crypto-currencies available on the crypto-wallet, graphical wallet features, etc.

At 606, the risk prediction system 200 predicts a likelihood of the cardholder 104 performing risky wallet transactions with a crypto-wallet in the subsequent time interval based, at least in part, on the wallet transaction features associated with the set of crypto-wallets and a wallet reload risk model 214*a*.

At step 608, the risk prediction system 200 generates a wallet reload risk score associated with the cardholder 104 for the crypto-wallet based, at least in part, on the predicting step. The wallet reload risk score indicates the likelihood of a cardholder 104 performing a high-risk payment transaction by reloading a money into the crypto-wallet intended to perform a cryptocurrency purchase.

Figure 7:
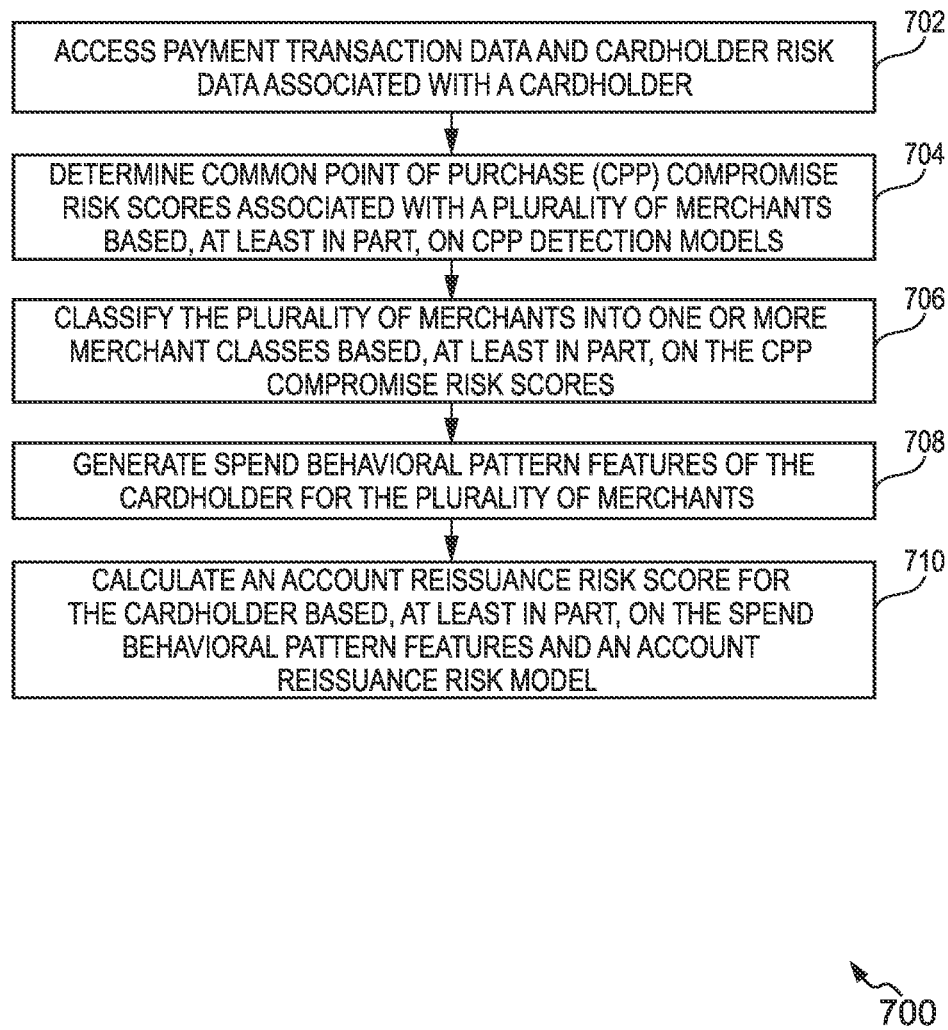
FIG. 7 is a flowchart for determining an account reissuance risk score for a cardholder, in accordance with an embodiment of the present disclosure.

FIG. 7 is a flowchart 700 for determining an account reissuance risk score of a cardholder, in accordance with an embodiment of the present disclosure. The sequence of operations of the flowchart 700 may not be necessarily executed in the same order as they are presented. Further, one or more operations may be grouped and performed in form of a single step, or one operation may have several sub-steps that may be performed in parallel or in a sequential manner.

At step 702, the server system 102 accesses payment transaction data and cardholder risk data associated with a cardholder 104. The payment transaction data includes a set of transaction variables associated with past payment transactions performed at one or more Point of Interaction (POI) terminals within a particular time window. In one embodiment, the POI terminals may include merchant terminals, crypto-wallets, POS, and the like. The cardholder risk data may include fraud risk features, credit risk scores, and the like.

At step 704, the server system 102 determines the common point of purchase (CPP) compromise risk scores associated with a plurality of merchants, where the cardholder 104 has performed payment transactions within the particular time window, based, at least in part, on CPP detection models 504.

At step 706, the server system 102 classifies the plurality of merchants into one or more merchant classes based, at least in part, on the CPP compromise risk scores. The one or more merchant classes consist of a breached merchant, a testing merchant, and a high-risk merchant.

At step 708, the server system 102 generates spend behavioral pattern features of the cardholder for the plurality of merchants.

At step 710, the server system 102 calculates an account reissuance risk score for the cardholder 104 based, at least in part, on the spend behavioral pattern features and an account reissuance risk model 122. The account reissuance risk score indicates a probability of a payment card 106 being reissued to the cardholder 104 due to fraudulent activity by the issuer server 116 in a subsequent time period.

Figure 8:
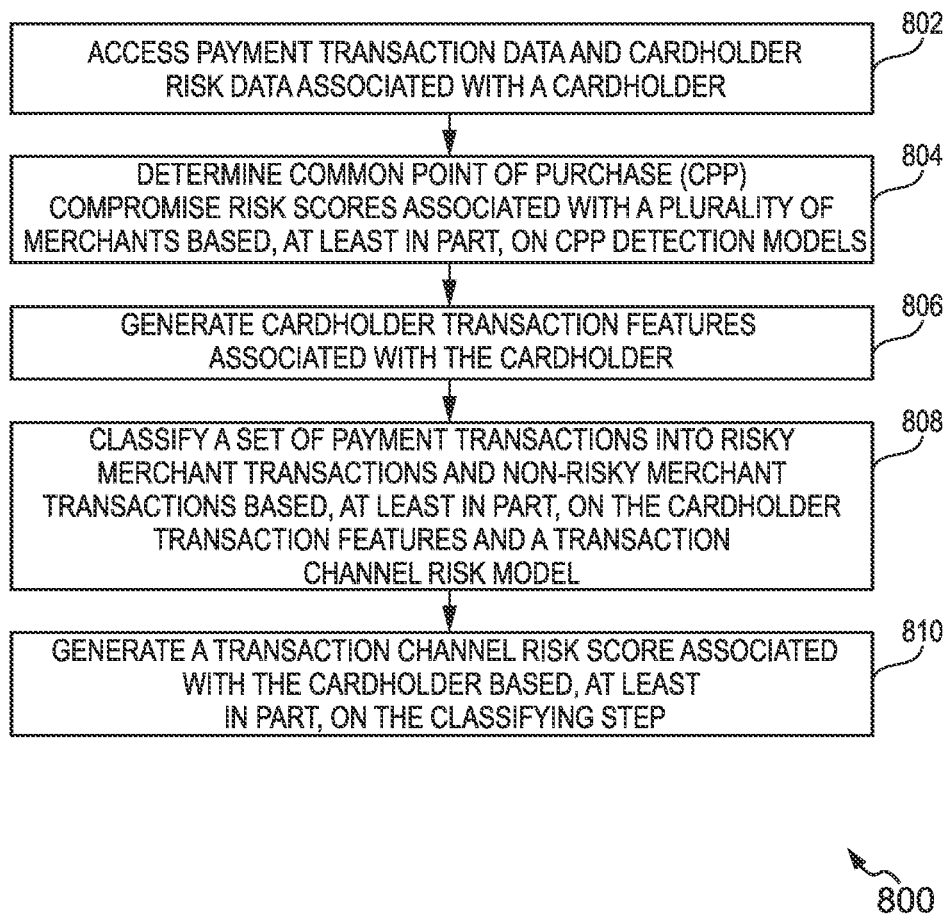
FIG. 8 is a flowchart for determining a transaction channel risk score for a cardholder, in accordance with an embodiment of the present disclosure.

FIG. 8 is a flowchart 800 for determining a transaction channel risk score of a cardholder for a particular time interval, in accordance with an embodiment of the present disclosure. The sequence of operations of the flowchart 800 may not be necessarily executed in the same order as they are presented. Further, one or more operations may be grouped together and performed in form of a single step, or one operation may have several sub-steps that may be performed in parallel or in a sequential manner.

At 802, the server system 102 accesses payment transaction data and cardholder risk data associated with a cardholder 104. The payment transaction data includes a set of transaction variables associated with past payment transactions performed at merchant terminals of a plurality of merchants. The cardholder risk data may include fraud features associated, credit risk scores, and the like.

At 804, the server system 102 determines the common point of purchase (CPP) compromise risk scores associated with a plurality of merchants based, at least in part, on CPP detection models 504.

At 806, the server system 102 generates cardholder transaction features associated with the cardholder 104. The cardholder transaction features may include card spending in top risky MCC or industry or country, card-level transaction channel features (e.g., number and amount of transactions that are cross-border, card-present/card-not-present, or declined, card activity features, number and amount of transactions in non-risky country, MCC, or industry, etc. The top risky MCCs, industry, or country is calculated by checking the number of CPPs that emerge from each category (e.g., MCC, industry, country) historically.

At 808, the server system 102 classifies a set of payment transactions (i.e., a group of the past payment transactions performed at merchant terminals) into risky merchant transactions and non-risky merchant transactions based, at least in part, on the cardholder transaction features and a transaction channel risk model 124. The risky merchant transactions are those transactions that are performed at merchants that will be CPP compromised within a particular time interval. If the cardholder 104 performs a payment transaction within a particular time interval, the payment transaction is labeled as "1" (i.e., risky merchant transactions). In one embodiment, the transaction channel risk model 124 is a binary classification model trained based on gradient boosting methods.

At 810, the server system 102 generates a transaction channel risk score associated with the cardholder 104 based, at least in part, on the classifying step. The transaction channel risk score indicates a probability of the payment card 106 associated with the cardholder 104 being compromised while transacting with a potentially risky merchant in a subsequent time period. When the transaction channel risk score is greater than a threshold value, it means that the payment card is going to transact in high risky merchants in the future.

Figure 9:
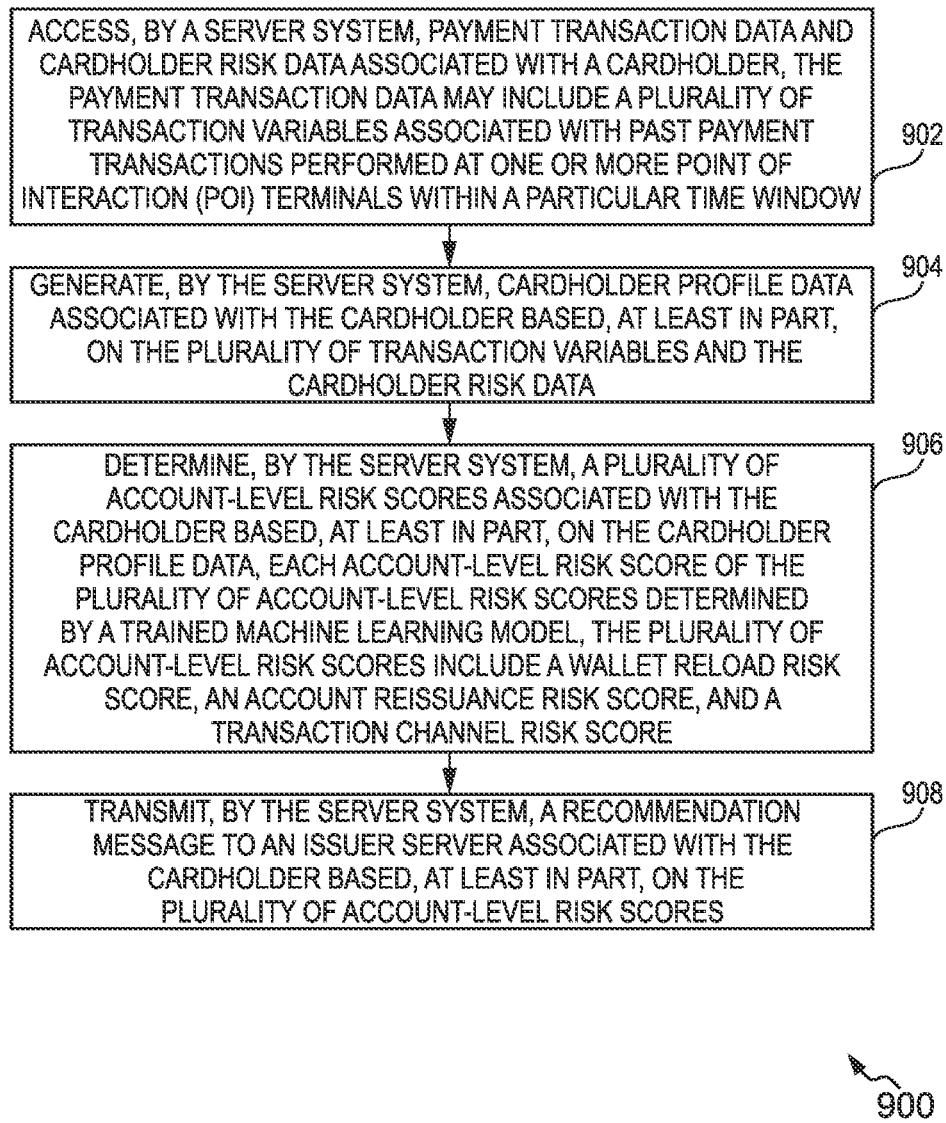
FIG. 9 is a flowchart of a computer-implemented method for predicting account-level risk scores associated with the cardholder, in accordance with an embodiment of the present disclosure.

FIG. 9 is a flow chart of a computer-implemented method 900 for predicting account-level risk scores associated with a cardholder, in accordance with an embodiment of the present disclosure. The method 900 depicted in the flow chart may be executed by, for example, a computer system. The computer system is identical to the risk prediction system 200 or the server system 102. Operations of the flow chart of the method 900, and combinations of operations in the flow chart of the method 900, may be implemented by, for example, hardware, firmware, a processor, circuitry, and/or a different device associated with the execution of software that includes one or more computer program instructions. It is noted that the operations of the method 900 can be described and/or practiced by using a system other than these computer systems. The method 900 starts at operation 902.

At the operation 902, the server system 102 accesses payment transaction data and cardholder risk data associated with a cardholder 104. The payment transaction data comprises a plurality of transaction variables associated with past payment transactions performed at one or more Point of Interaction (POI) terminals within a particular time window. In one embodiment, the POI terminals may include merchant terminals, crypto-wallets, POS, and the like. The cardholder risk data may include fraud features associated, credit risk scores, and the like. The plurality of transaction variables includes at least: POI terminal type indicator, payment transaction type indicator, a number of spend transactions at the one or more POI terminals within the particular time window, authorization data, and fraud risk data.

At operation 904, the server system 102 generates cardholder profile data associated with the cardholder 104 based, at least in part, on the plurality of transaction variables and the cardholder risk data. The cardholder profile includes (a) wallet transaction features associated with the set of crypto-wallets, (b) spend behavioral pattern features of the cardholder at the merchant terminals, and (c) cardholder transaction features according to merchant risk profiles.

At operation 906, the server system 102 determines a plurality of account-level risk scores associated with the cardholder 104 based, at least in part, on the cardholder profile data. Each account-level risk score of the plurality of account-level risk scores determined by a trained machine learning model. The plurality of account-level risk scores includes a wallet reload risk score, an account reissuance risk score, and a transaction channel risk score.

At operation 908, the server system 102 transmits a recommendation message to an issuer server associated with the cardholder 104 based, at least in part, on the plurality of account-level risk scores. The issuer server 116, based on the received recommendation message, performs remedial actions, accepts/declines reloading of crypto-wallet, authorizes the transaction, declines the transaction, or reissues a new payment card 106 to the cardholder 104.

Figure 10:
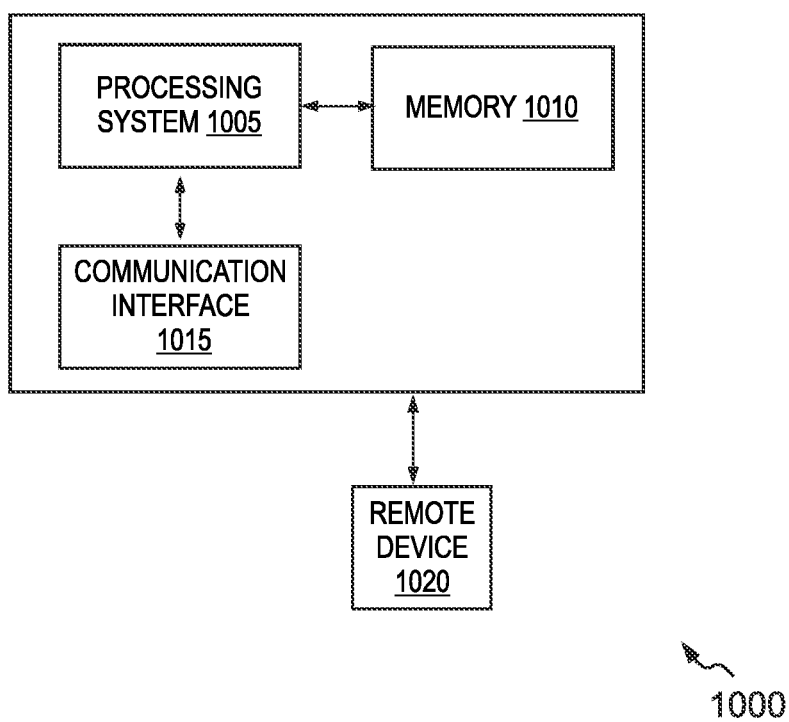
FIG. 10 is a block diagram of a payment server, in accordance with one embodiment of the present disclosure.

FIG. 10 is a simplified block diagram of a payment server 1000, in accordance with an embodiment of the present disclosure. The payment server 1000 is an example of the payment server 112 of FIGS. 1A & 1B. A payment network may be used by the payment server 1000 as a payment interchange network. Examples of payment interchange networks include, but are not limited to, Mastercard® payment system interchange network. The payment server 1000 includes a processing system 1005 configured to extract programming instructions from a memory 1010 to provide various features of the present disclosure. Further, two or more components may be embodied in one single component, and/or one component may be configured using multiple sub-components to achieve the desired functionalities. Some components of the payment server 1000 may be configured using hardware elements, software elements, firmware elements, and/or a combination thereof. In one embodiment, the payment server 1000 is configured to a payment transaction request to the issuer server 116 via the acquirer server 120 and the payment network 114.

Via a communication interface 1015, the processing system 1005 receives a payment authorization request from a remote device 1020 such as the server system 102, the acquirer server 120, or administrators managing server activities. The payment server 1000 may also perform similar operations as performed by the server system 102.

Figure 11:
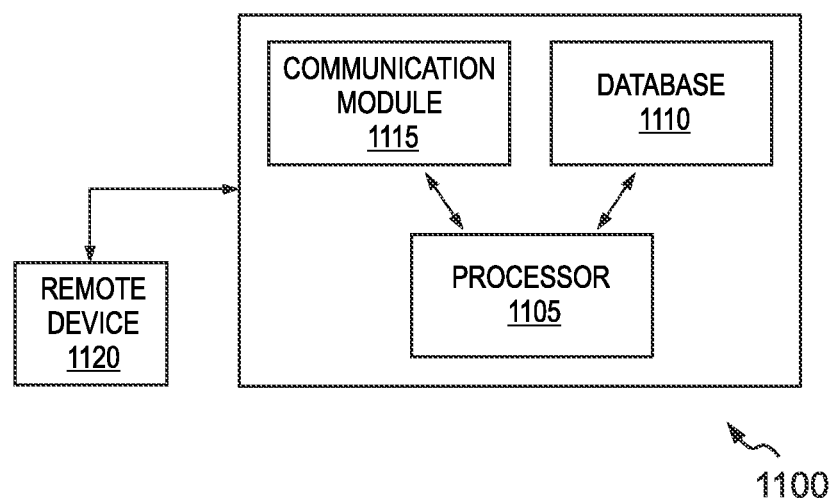
FIG. 11 is a simplified block diagram of an issuer server, in accordance with one embodiment of the present disclosure.

FIG. 11 is a simplified block diagram of an issuer server 1100, in accordance with one embodiment of the present disclosure. The issuer server 1100 is associated with an issuer bank/issuer, in which a user (e.g., the cardholder 104) may have an account. The issuer server 1100 is an example of the issuer server 116 of FIG. 1A, or may be embodied in the issuer server 116. The issuer server 1100 includes a processor 1105 communicably coupled to a database 1110 and a communication module 1115. The components of the issuer server 1100 provided herein may not be exhaustive, and the issuer server 1100 may include more or fewer components than those depicted in FIG. 11. Further, two or more components may be embodied in one single component, and/or one component may be configured using multiple sub-components to achieve the desired functionalities. Some components of the issuer server 1100 may be configured using hardware elements, software elements, firmware elements, and/or a combination thereof.

The database 1110 includes information associated with the cardholder 104, such as, but not limited to, a primary account number (PAN one or more parameters), a name, a city, a postal code, and the like.

Via a communication module 1115, the processor 1105 may receive information from a remote device 1120 such as the issuer server 116, server system 102, and the acquirer server 120. In an embodiment, the processor 1105 may communicate the information related to the cardholder 104 to the server system 102 for performing offline transactions using payment wireless access network.

Figure 12:
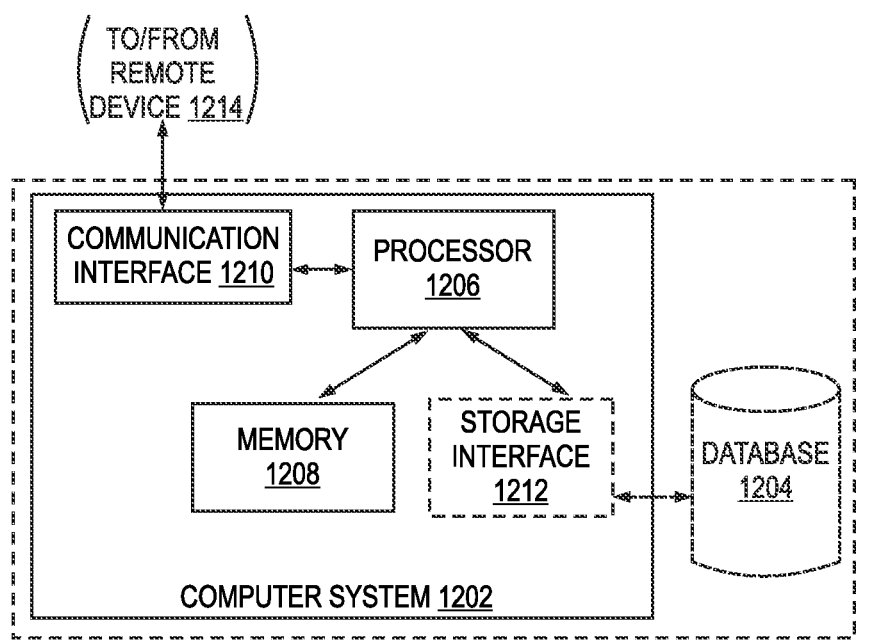
FIG. 12 is a simplified block diagram of a server system, in accordance with one embodiment of the present disclosure.

FIG. 12 is a simplified block diagram of a server system 1200, in accordance with an embodiment of the present disclosure. The server system 1200 is an example of the server system 102 of FIGS. 1A & 1B. The server system 1200 is also an example of the risk prediction system 200 of FIG. 2. The server system 1200 shows the hardware configuration of the server system 102 or the risk prediction system 200. The server system 1200 includes a computer system 1202 and a database 1204. In an embodiment, the server system 1200 is integrated, but not limited to, in the issuer server 116 in the acquirer server 120, or in the crypto-wallet server 142 (Referring to FIGS. 1A&1B).

The computer system 1202 includes at least one processor 1206 configured to execute executable instructions for performing operations similar to the risk prediction system 200. The executing instructions are stored in a memory 1208. The components of the computer system 1202 provided herein may not be exhaustive and the computer system 1202 may include more or fewer components than those depicted in FIG. 12. Further, two or more components may be embodied in one single component, and/or one component may be configured using multiple sub-components to achieve the desired functionalities. Some components of the computer system 1202 may be configured using hardware elements, software elements, firmware elements, and/or a combination thereof.

The processor 1206 is operatively coupled to a communication interface 1210 such that the computer system 1202 is capable of communicating with a remote device 1214 such as the server system 102, or the acquirer server 120 associated with the payment network 114, or of communicating with any entity connected to the network 126 (shown in FIG. 1) or any constituents of the server system 102. In an embodiment, the processor 1206 may be capable of accessing the transaction data associated with the customers from the database 1204.

In some embodiments, the database 1204 is integrated within computer system 1202. For example, the computer system 1202 may include one or more hard disk drives as the database 1204. The storage interface 1212 is any component capable of providing the processor 1206 with access to the database 1204. The storage interface 1212 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1206 with access to the database 1204.

The disclosed methods with reference to FIGS. 6, 7, 8, and 9, or one or more operations of the server system 1200 or the risk prediction system 200 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, netbook, Webbook, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during the implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal-oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or in Digital Signal Processor (DSP) circuitry).

Particularly, the server system 1200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g. magneto-optical disks), CD-ROM (compact disc read-only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

We claim:

1. A computer-implemented method, comprising:
accessing, by a server system from a transaction database via a network, payment transaction data and cardholder risk data associated with a cardholder, the payment transaction data comprising a plurality of transaction variables associated with past payment transactions performed at one or more Point of Interaction (POI) terminals within a particular time window;
generating, by the server system, cardholder profile data associated with the cardholder based, at least in part, on the plurality of transaction variables and the cardholder risk data, the cardholder profile data comprising: (a) wallet transaction features associated with a set of crypto-wallets, (b) spend behavioral pattern features of the cardholder for a plurality of merchant terminals associated with a plurality of merchants, and (c) cardholder transaction features according to merchant risk profiles;
determining, by the server system, a plurality of account-level risk scores associated with the cardholder based, at least in part, on the cardholder profile data, the plurality of account-level risk scores determined by a plurality of trained machine learning models, the plurality of account-level risk scores comprising: (a) a wallet reload risk score, (b) an account reissuance risk score, and (c) a transaction channel risk score, the plurality of trained machine learning models comprising: (a) a wallet reload risk model, (b) an account reissuance risk model, and (c) a transaction channel risk model;
wherein determining the plurality of account-level risk scores comprises:
generating, by the server system using the wallet reload risk model, the wallet reload risk score associated with the cardholder and a crypto-wallet, the wallet reload risk score indicating a likelihood of the cardholder performing risky wallet transactions with the crypto-wallet in a subsequent time interval based, at least in part, on the wallet transaction features associated with the set of crypto-wallets;
generating, by the server system using the account reissuance risk model, the account reissuance risk score based, at least in part, on the spend behavioral pattern features of the cardholder, the account reissuance risk score indicating a probability of one or more payment cards of the cardholder to be reissued within the subsequent time interval, wherein the spend behavioral pattern features comprise one or more of: (a) merchant features based on common point of purchase (CPP) compromise risk scores of the plurality of merchants, (b) cardholder interaction features with the plurality of merchants classified into a set of merchant classes, (c) cardholder risk features, or (d) payment network related risk features; and
generating, by the server system using the transaction channel risk model, the transaction channel risk score associated with the cardholder based, at least in part, on the merchant risk profiles including one or more of a location and a processor of a risky merchant where a payment card number was stolen, the transaction channel risk score indicating a probability of the one or more payment cards of the cardholder being compromised while transacting with the risky merchant within a subsequent time period; and
transmitting, via the network by a recommendation engine associated with the server system, a recommendation message to an issuer server associated with the cardholder based, at least in part, on the plurality of account-level risk scores for performing an action in response to the recommendation message.

2. The computer-implemented method as claimed in claim 1, wherein the plurality of transaction variables comprises at least: POI terminal type indicator, payment transaction type indicator, a number of spend transactions at the one or more POI terminals within the particular time window, authorization data, and fraud risk data.

3. The computer-implemented method as claimed in claim 1, wherein the one or more POI terminals comprise a set of crypto-wallets and merchant terminals.

4. The computer-implemented method as claimed in claim 1, further comprising:
training the wallet reload risk model, the account reissuance risk model, and the transaction channel risk model using the payment transaction data stored in the transaction database.

5. The computer-implemented method as claimed in claim 1, further comprising:
classifying, by the server system, a set of payment transactions of the cardholder into risky merchant transactions and non-risky merchant transactions based, at least in part, on the cardholder transaction features and the transaction channel risk model; and
generating, by the server system, the transaction channel risk score associated with the cardholder based, at least in part, on the classifying step.

6. The computer-implemented method as claimed in claim 1, wherein the recommendation message is transmitted to the issuer server in real-time when the cardholder is performing a payment transaction or a crypto-wallet transaction.

7. The computer-implemented method as claimed in claim 1, wherein the wallet reload risk model is a gradient boosting decision tree (GBDT) based classification model.

8. The computer-implemented method as claimed in claim 1, wherein the action comprises: (a) accepting or declining reloading of the crypto-wallet, (b) authorizing or declining a payment transaction, or (c) reissuing a payment card to the cardholder.

9. A server system, comprising:
a communication interface;
a memory comprising machine-readable instructions; and
a processor communicably coupled to the communication interface and the memory, the processor configured to execute the machine-readable instructions to cause the server system at least in part to:
  access, from a transaction database via a network, payment transaction data and cardholder risk data associated with a cardholder, the payment transaction data comprising a plurality of transaction variables associated with past payment transactions performed at one or more Point of Interaction (POI) terminals within a particular time window;
  generate cardholder profile data associated with the cardholder based, at least in part, on the plurality of transaction variables and the cardholder risk data, the cardholder profile data comprising: (a) wallet transaction features associated with a set of crypto-wallets, (b) spend behavioral pattern features of the cardholder for a plurality of merchant terminals associated with a plurality of merchants, and (c) cardholder transaction features according to merchant risk profiles;
  determine a plurality of account-level risk scores associated with the cardholder based, at least in part, on the cardholder profile data, the plurality of account-level risk scores determined by a plurality of trained machine learning models, the plurality of account-level risk scores comprising: (a) a wallet reload risk score, (b) an account reissuance risk score, and (c) a transaction channel risk score, the plurality of trained machine learning models comprising: (a) a wallet reload risk model, (b) an account reissuance risk model, and (c) a transaction channel risk model;
  wherein determining the plurality of account-level risk scores comprises:
    generating, using the wallet reload risk model, the wallet reload risk score associated with the cardholder and a crypto-wallet, the wallet reload risk score indicating a likelihood of the cardholder performing risky wallet transactions with the crypto-wallet in a subsequent time interval based, at least in part, on the wallet transaction features associated with the set of crypto-wallets;
    generating, using the account reissuance risk model, the account reissuance risk score based, at least in part, on the spend behavioral pattern features of the cardholder, the account reissuance risk score indicating a probability of one or more payment cards of the cardholder to be reissued within the subsequent time interval, wherein the spend behavioral pattern features comprise one or more of: (a) merchant features based on common point of purchase (CPP) compromise risk scores of the plurality of merchants, (b) cardholder interaction features with the plurality of merchants classified into a set of merchant classes, (c) cardholder risk features, and (d) payment network related risk features; and
    generating, using the transaction channel risk model, the transaction channel risk score associated with the cardholder based, at least in part, on the merchant risk profiles including one or more of a location and a processor of a risky merchant where a payment card number was stolen, the transaction channel risk score indicating a probability of the one or more payment cards of the cardholder being compromised while transacting with the risky merchant within a subsequent time period; and
    transmit, via the network by a recommendation engine, a recommendation message to an issuer server associated with the cardholder based, at least in part, on the plurality of account-level risk scores for performing an action in response to the recommendation message.

10. The server system as claimed in claim 9, wherein the plurality of transaction variables comprises at least: POI terminal type indicator, payment transaction type indicator, a number of spend transactions at the one or more POI terminals within the particular time window, authorization data, and fraud risk data.

11. The server system as claimed in claim 9, wherein the one or more POI terminals comprise a set of crypto-wallets and merchant terminals.

12. The server system as claimed in claim 9, wherein the server system is further caused, at least in part, to:
  train the wallet reload risk model, the account reissuance risk model, and the transaction channel risk model using the payment transaction data stored in the transaction database.

13. The server system as claimed in claim 9, wherein the server system is further caused, at least in part, to:
  classify a set of payment transactions of the cardholder into risky merchant transactions and non-risky merchant transactions in a pre-determined time period based, at least in part, on the cardholder transaction features and the transaction channel risk model; and
  generate the transaction channel risk score associated with the cardholder based, at least in part, on the classification.

14. The server system as claimed in claim 9, wherein the recommendation message is transmitted to the issuer server in real-time when the cardholder is performing a payment transaction or a crypto-wallet transaction.

15. The server system as claimed in claim 9, wherein the wallet reload risk model is a gradient boosting decision tree (GBDT) based classification model.

16. The server system as claimed in claim 9, wherein the action comprises: (a) accepting or declining reloading of the crypto-wallet, (b) authorizing or declining a payment transaction, or (c) reissuing a payment card to the cardholder.

17. A non-transitory computer-readable storage medium comprising computer-executable instructions that, when executed by at least a processor of a server system, cause the server system to perform a method comprising:
  accessing, by the server system from a transaction database via a network, payment transaction data and cardholder risk data associated with a cardholder, the payment transaction data comprising a plurality of transaction variables associated with past payment transactions performed at one or more Point of Interaction (POI) terminals within a particular time window;
  generating, by the server system, cardholder profile data associated with the cardholder based, at least in part, on the plurality of transaction variables and the cardholder risk data, the cardholder profile data comprising: (a) wallet transaction features associated with a set of crypto-wallets, (b) spend behavioral pattern features of the cardholder for a plurality of merchant terminals associated with a plurality of merchants, and (c) cardholder transaction features according to merchant risk profiles;
  determining, by the server system, a plurality of account-level risk scores associated with the cardholder based, at least in part, on the cardholder profile data, the plurality of account-level risk scores determined by a plurality of trained machine learning models, the plurality of account-level risk scores comprising: (a) a wallet reload risk score, (b) an account reissuance risk score, and (c) a transaction channel risk score, the plurality of trained machine learning models comprising: (a) a wallet reload risk model, (b) an account reissuance risk model, and (c) a transaction channel risk model;

wherein determining the plurality of account-level risk scores comprises:

generating, by the server system using the wallet reload risk model, the wallet reload risk score associated with the cardholder and a crypto-wallet, step the wallet reload risk score indicating a likelihood of the cardholder performing risky wallet transactions with the crypto-wallet in a subsequent time interval based, at least in part, on the wallet transaction features associated with the set of crypto-wallets;

generating, by the server system using the account reissuance risk model, the account reissuance risk score based, at least in part, on the spend behavioral pattern features of the cardholder, the account reissuance risk score indicating a probability of one or more payment cards of the cardholder to be reissued within the subsequent time interval, wherein the spend behavioral pattern features comprise one or more of: (a) merchant features based on common point of purchase (CPP) compromise risk scores of the plurality of merchants, (b) cardholder interaction features with the plurality of merchants classified into a set of merchant classes, (c) cardholder risk features, and (d) payment network related risk features; and generating, by the server system using the transaction channel risk model, the transaction channel risk score associated with the cardholder based, at least in part, on the merchant risk profiles including one or more of a location and a processor of a risky merchant where a payment card number was stolen, the transaction channel risk score indicating a probability of the one or more payment cards of the cardholder being compromised while transacting with the risky merchant within a subsequent time period; and transmitting, via the network by a recommendation engine associated with the server system, a recommendation message to an issuer server associated with the cardholder based, at least in part, on the plurality of account-level risk scores for performing an action in response to the recommendation message.

18. The non-transitory computer-readable storage medium as claimed in claim 17, wherein the method further comprises:

training the wallet reload risk model, the account reissuance risk model, and the transaction channel risk model using the payment transaction data stored in the transaction database.

19. The non-transitory computer-readable storage medium as claimed in claim 17, wherein the wallet reload risk model is a gradient boosting decision tree (GBDT) based classification model.

20. The non-transitory computer-readable storage medium as claimed in claim 17, wherein the action comprises: (a) accepting or declining reloading of the crypto-wallet, (b) authorizing or declining a payment transaction, or (c) reissuing a payment card to the cardholder.

* * * * *